US011909880B2

(12) United States Patent
Wilson et al.

(10) Patent No.: US 11,909,880 B2
(45) Date of Patent: *Feb. 20, 2024

(54) CENTRALIZED CREDENTIAL ISSUANCE AND ROTATION

(71) Applicant: ValiMail Inc., San Francisco, CA (US)

(72) Inventors: Ashley Duane Wilson, San Francisco, CA (US); Peter Martin Goldstein, San Francisco, CA (US)

(73) Assignee: ValiMail Inc., San Francisco, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/353,392

(22) Filed: Jun. 21, 2021

(65) Prior Publication Data

US 2021/0314157 A1    Oct. 7, 2021

Related U.S. Application Data

(63) Continuation of application No. 17/030,866, filed on Sep. 24, 2020, now Pat. No. 11,063,763.

(Continued)

(51) Int. Cl.
*H04L 9/32* (2006.01)
*H04L 9/08* (2006.01)
(Continued)

(52) U.S. Cl.
CPC .......... *H04L 9/3213* (2013.01); *H04L 9/0825* (2013.01); *H04L 61/4511* (2022.05); *H04L 67/133* (2022.05)

(58) Field of Classification Search
CPC . H04L 9/3213; H04L 9/0825; H04L 61/1511; H04L 67/40
See application file for complete search history.

(56) References Cited

U.S. PATENT DOCUMENTS 7,334,254 B1    2/2008  Boydstun
9,887,975 B1    2/2018  Gifford
(Continued)

FOREIGN PATENT DOCUMENTS

EP          3373510 A1      9/2018
WO     WO 00/42730 A1      7/2000

OTHER PUBLICATIONS

GSMA. "IoT Security Guidelines for IoT Service Ecosystems." GSM Association, Version 2.1, Mar. 31, 2019, pp. 1-60.

(Continued)

*Primary Examiner* — Oleg Korsak
(74) *Attorney, Agent, or Firm* — Fenwick & West LLP

(57) ABSTRACT

Embodiments relate to a system that may include a third-party server and a domain name system (DNS). The third-party server may be configured to receive a request for a credential from a named entity device for the named entity device to communicate with an application programming interface (API). The API may be associated with a domain. The third-party server may obtain the credential from the API. The third-party server may encrypt the credential with a public key corresponding to the named entity device to generate an encrypted credential. The DNS may be configured to receive the encrypted credential and publish a DNS record at a namespace of the DNS, the DNS record containing the encrypted credential for the named entity device to retrieve the credential. The named entity device may decrypt the encrypted credential by the private key stored at the device.

20 Claims, 8 Drawing Sheets

Related U.S. Application Data

(60) Provisional application No. 62/906,015, filed on Sep. 25, 2019.

(51) Int. Cl.
  *H04L 61/4511* (2022.01)
  *H04L 67/133* (2022.01)

(56) References Cited

U.S. PATENT DOCUMENTS

| | | |
|---|---|---|
| 10,958,734 B2 * | 3/2021 | Laibson ............... H04L 9/0894 |
| 2004/0073792 A1 | 4/2004 | Noble |
| 2004/0128547 A1 | 7/2004 | Laidlaw |
| 2012/0008769 A1 | 1/2012 | Collins et al. |
| 2015/0180857 A1 | 6/2015 | Schulman et al. |
| 2016/0337104 A1 | 11/2016 | Kalligudd |
| 2019/0273730 A1 | 9/2019 | Yefimov |

OTHER PUBLICATIONS

Miranda, C. D. B. "Large Scale Secure Automatic Provisioning of X.509 Certificates via Web Services." PKI, MA Thesis, Department of Computer Science, 2015, pp. i-99.

PCT International Search Report and Written Opinion, PCT Application No. PCT/US2020/052434, dated Dec. 23, 2020, eight pages.

Saunders, J. "CA Single Sign-On Hardening." White Paper, Jan. 2015, 10 pages.

Van Der Stock, A. et al. "Application Security Verification Standard 4.0." OWASP, Mar. 2019, pp. 1-68.

Extended European Search Report and Written Opinion, European Patent Application No. 20868448.0, dated Sep. 19, 2023, 7 pages.

* cited by examiner

CENTRALIZED CREDENTIAL ISSUANCE AND ROTATION

CROSS-REFERENCE TO RELATED APPLICATION

This application is a continuation of U.S. application Ser. No. 17/030,866, filed on Sep. 24, 2020, which claims benefit to U.S. Provisional Patent Application No. 62/906,015, filed on Sep. 25, 2019, which is incorporated by reference herein for all purposes.

TECHNICAL FIELD

The present disclosure generally relates to the security management of Internet-enabled devices and, more specifically, to credential escrow management of the devices through a centralized server.

BACKGROUND

Managing an application programming interface (API) server can be challenging from both the security and resource standpoints. From the security perspective, it is often desirable for an API server to authenticate a device to establish a secure connection with the device. To avoid having to authenticate the device repeatedly every time a message is transmitted, an API server often generates a session token for the device as a proof of being the authenticated party in a communication session. However, managing session tokens can put burdens on the API server. If a new session token is issued every time a client-side integration interacts with the API server, multiple valid session tokens may exist at the same time for the same set of API credentials. For example, this may occur in an integration that runs every minute, and which obtains a fresh session token with a 15-minute lifetime every time it runs. Accidental oversubscription of the part of the application which manages session tokens could cause performance issues. Poorly written (malicious or otherwise) client integrations could result in unnecessary loads being placed on the authentication component of the application, which is a common gating factor for many API servers and clients.

Figure 1:
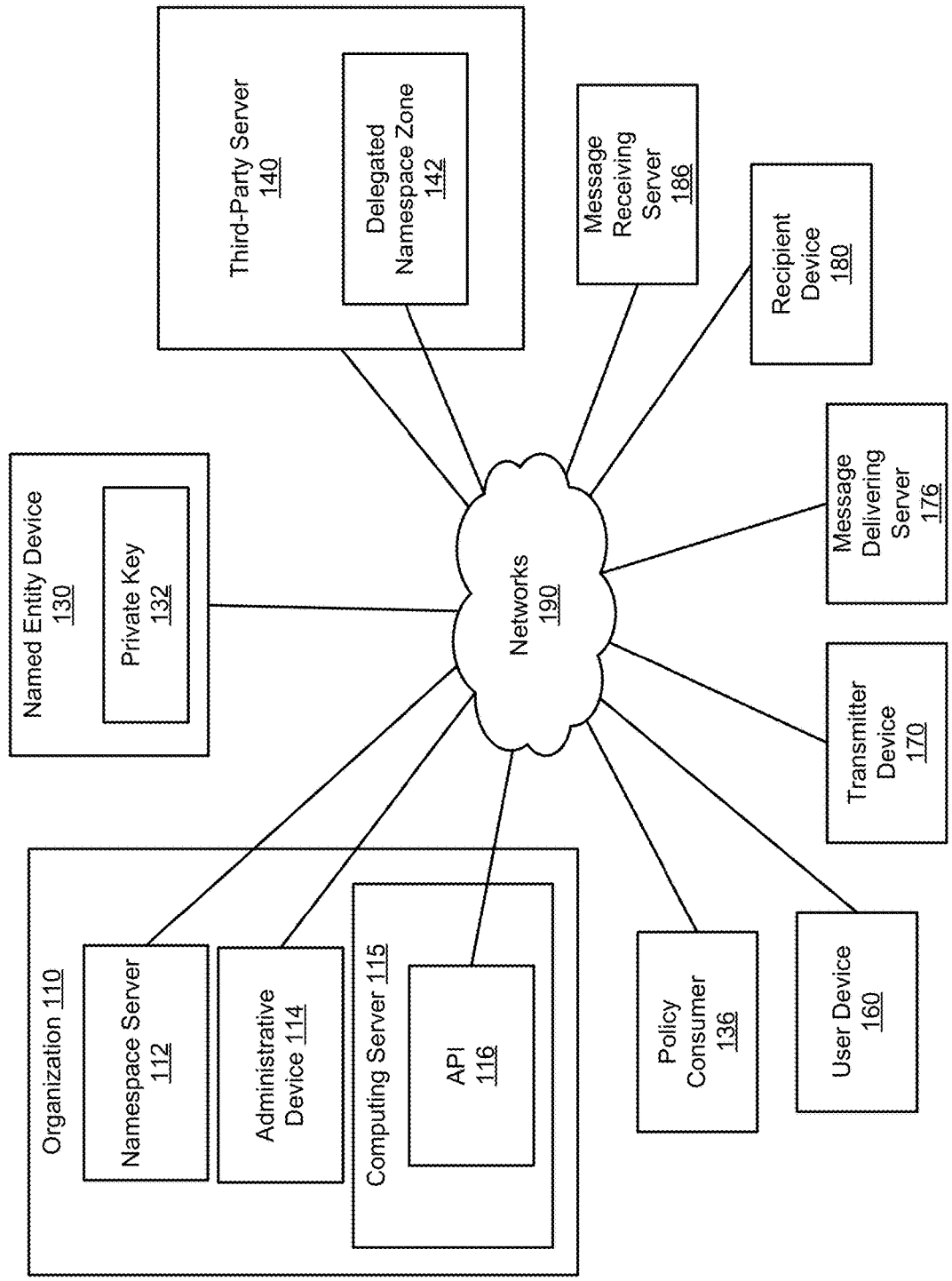
FIG. 1 is a block diagram illustrating an example system environment, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview:

Embodiments described herein are related to a credential escrow management service that may be performed by a third-party server which manages credentials for client devices of an API server and serves as a middle party to deliver session token generated by the API server to the client device in a secure manner. For a client device to establish an authenticated session with the API server, the device's API credential will need to be provided to the API server. Upon authenticating the API credential, the API server may generate a session token that lasts for a period of time. The client device may include the session token in messages exchanged during the lifetime of the token to prove that the device is the authenticated party. An area of concern for the security of users and IoT devices is the recoverability of API access credentials from device storage. API credentials are often text-based. The storage of the credentials in the device's non-volatile memory could pose a security risk for many client devices because a malicious party may be able to obtain the credentials through tampering with the device's storage. Recovered credentials require deliberate revocation by a party responsible for maintaining API access permissions. Many designers of devices, such as Internet-of-Things (IoT) devices, face the dilemma of reducing the overhead of the devices and keeping the confidential credentials secure.

In some embodiments, instead of saving the API credentials in client devices, the API credentials may be deposited to a credential escrow management service of a third-party server that is specialized in safeguarding credentials and other confidential information. To establish a communication session, the client device may query a domain name system (DNS). Upon receiving the query, the third-party server may provide the API credential to the API server for the API server to generate a session token. The API server may return the session token. The third-party server may use the client device's public key, which may be retrievable from the client device's DNS record, to encrypt the session token. The third-party server may transmit the encrypted session token to the client device, such as by posting the encrypted session token at a DNS record. The client device may retrieve the encrypted session token and use its private key to decrypt the session token.

Example System Environment:

Referring now to figure (FIG. 1A, shown is a block diagram illustrating an embodiment of an example system environment 100 of a process delegation system in which an organization may delegate various tasks to a third-party server that is specialized in performing the tasks, in accordance with some embodiments. The system environment 100 may include an organization 110, a named entity device 130, a third-party server 140 that performs various delegated tasks, a policy consumer 136, a user device 160, a transmitter device 170, a recipient device 180, and networks 190. In some embodiments, the system environment 100 may also include a message delivering server 176 and a message receiving server 186. In various embodiments, the system 100 may include different, additional or fewer components and entities. Also, in some implementations or situations, certain components' roles may overlap. For example, the named entity device 130 may serve as the policy consumer 136, the user device 160, the transmitter device 170, message delivering server 176, the recipient device 180, or the message receiving server 186, depending on the situation. The functionalities of each element may be distributed differently among the elements in various embodiments.

While some of the components in the system environment 100 may at times be described in a singular form while other components may be described in a plural form, the system environment 100 may include one or more of each of the components. For simplicity, multiple instances of a type of entity or component in the system environment 100 may be referred to in a singular form even though the system may include one or more such entities or components. For example, in one embodiment, while the organization 110 and the named entity device 130 may be referred to in a singular form, the third-party server 140 may be a service provider that serves multiple organizations 110, each of which may be in communication with multiple named entity devices 130. Conversely, a component being described in the plural form does not necessarily imply that more than one copy of the component is always needed in the environment 100.

An organization 110 may be any suitable entity such as a government entity, a private business, a profit organization or a non-profit organization. An organization 110 may define an environment in which a group of units, individuals, and devices organize and perform activities and exchange information. The system environment 100 may include multiple organizations 110, which may be customers of the third-party server 140 and delegate certain tasks to the third-party server 140. In some embodiments, each organization 110 may be associated with its own namespace such as a domain (example.com).

An organization 110 has resources that are under its control. Example resources include a namespace server 112, an administrative device 114, an application program interface (API) 116, and a computing server 115, whose components and functionalities will be discussed in further detail with reference to FIG. 2. In some embodiments, some of the named entity devices 130 may also be part of the organization's resources. For example, some of the named entity devices 130 may be controlled and operated by the organization 110. Some of the resources may be associated with a unique identifier under the namespace of the organization 110. For example, a device under the control of the organization having a domain example.com may have a DNS (domain name system) identifier (device1.example.com) for identification purposes.

Figure 9:
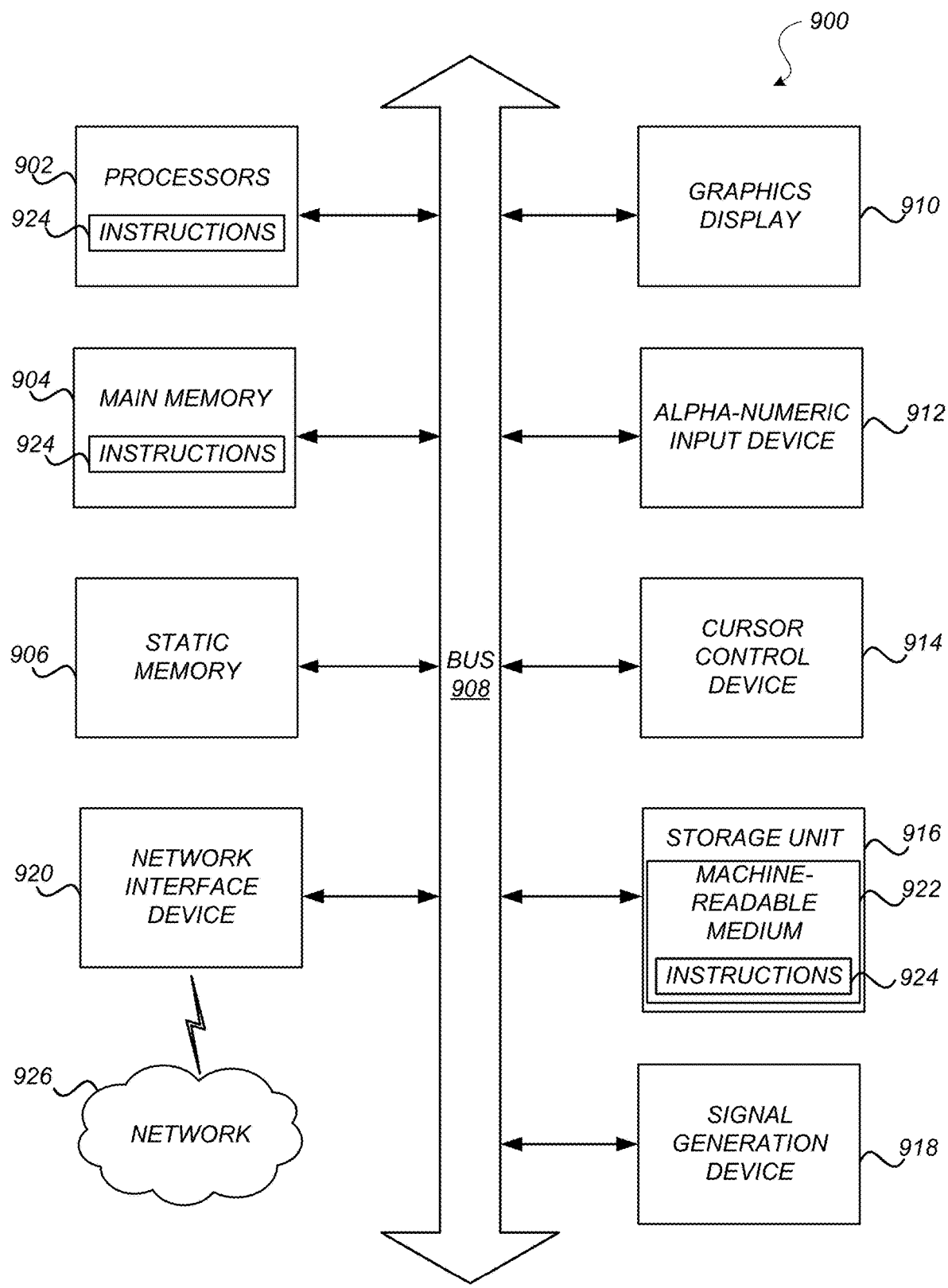
FIG. 9 is a block diagram illustrating components of an example computing machine, in accordance with some embodiments.

An organization 110 may include and control a namespace server 112. A namespace server 112 can be a domain owner DNS server. For example, an organization 110 may operate a BIND (Berkeley Internet Name Domain) server. Some or all of the components of a namespace server is illustrated in FIG. 9. The namespace server 112 for an organization 110 operates the namespace of the organization 110 (e.g., the domain of the organization 110), but may delegate a section of the namespace to the third-party server 140. For example, DNS is a distributed system that includes many parties working together to provide a cohesive namespace for the Internet. Starting from the root servers, each branch of the DNS is controlled by a party who may delegate sub-sections of the namespace to other parties. A namespace server 112 associated with an organization 110 may store DNS records for use in a DNS system, manage namespace for the domain name associated with the organization 110, delegate one or more sub-domains to other servers that can be authoritative, and answer queries about the namespace of the domain. A namespace server 112 may store multiple DNS records for a particular domain, such an A record (address record), MX record (mail exchange record), and so on.

By way of example, an organization 110 named "Example Corp" that operates various devices (each may be an example of a named entity device 130) may have a website located at www.example.com. The "com" portion of the namespace is maintained by a Top-Level Domain nameserver, which delegates (via a name server (NS) record) the management of the namespace "example.com" to Example Corp. Example Corp is responsible for maintaining the records under example.com, including www.example.com. Since the namespace may be many layers deep, Example Corp may organize its device identities under a specific branch of the DNS, such as "_devices.example.com". A pattern for identifying devices by serial and model, organized under the namespace example.com, may be serial.model._devices.example.com, or 123.sensor._devices.example.com. In some embodiments, an organization 110 may divide different branches of its namespace to different types of entities and devices. For example, natural persons may be under the namespace _persons.example.com while devices are under the namespace _devices.example.com. In another approach, the named entities may be assigned to a single branch, such as authentication.example.com. The wording used in the namespace can be arbitrary and does not always need to correspond to or have any relationship with the type of the named entity device 130.

DNS provides various types of records, including name-to-IP address resolution. DNS also has the ability to host specialized record types for public keys and certificates (DANE (DNS-based Authentication of Named Entities) or TLSA (Transport Layer Security Protocol), RFC 6698).

DKIM (Domain Keys Identified Mail) (RFC 6376) is another type of record that puts public keys in freeform TXT records.

An organization 110 may include one or more administrative devices 114 that manage the resources and namespace of the organization 110. Some or all of the components of an administrative device 114 is illustrated in FIG. 9. An administrative device 114 may be operated by an administrator, whether it is a robotic agent or a natural person. An administrative device 114 may manage identity records of named entity devices 130 that are associated with the organization 110. An administrative device 114 may also manage the configuration of various tasks that may be delegated to the third-party server 140, such as namespace management, credential escrow and authentication services, and policy distribution. An administrative device 114 may also change the settings associated with various components and resources in the organization 110.

The organization 110 may include a computing server 115 that may perform various computing tasks for the organization 110, provides services on behalf of the organization 110 and serves as the point of communication with devices that are internal or external to the organization 110. The precise scope of the tasks performed by the computing server 115 may depend on the nature of the organization 110 and decisions made by administrators of the organization 110. For example, an organization computing server 115 may be a data server that provides data to various devices in the system environment 100. In another example, the organization computing server 115 may collect data from various IoT devices (such as sensor devices in a traffic system to perform analytics. In yet another example, the organization computing server 115 may perform transactions with the organization's customers. Other tasks are also possible in different implementations. A service may be associated with a computer-implemented system that may facilitate the offering of any type of service to an entity or user of client devices. A client device may be a device that communicates with the computing server 115. A client device may be a named entity device 130 or may be anonymous.

In various embodiments, the organization computing server 115 may take different forms. Some or all of the components of a computing server 115 is illustrated in FIG. 9. The computing server 115 may be a server computer that includes software and one or more processors to execute code instructions to perform various processes described herein. The computing server 115 may also be a pool of computing devices that may be located at the same geographical location (e.g., a server room) or be distributed geographically (e.g., cloud computing, distributed computing, or in a virtual server network). The API 116 of the organization 110 provides an interface for various devices in the environment 100 to communicate with the organization computing server 115. The computing server 115 may also be referred to as an API server.

A named entity device 130 may be a device that is associated with an entity that has one or more identity records on the Internet. The identity records are often stored and published in a namespace system such as DNS. An entity may be a natural person with a smartcard-based identity, a device with a private key, or an instance of an application, service, or microservice with a name in the DNS. Examples of named entities may include natural persons (e.g., employees, outside contractors, administrators), properties, Internet of things (IoT) devices, equipment, machines, virtual objects, software applications, services, services, or any suitable objects or concepts that have names for identification. The named entity device 130 may be controlled manually by a person or autonomously by a machine.

By way of example, a named entity device 130 may be a roadside beacon (which may be an IoT device) with an identity record in a DNS zone. The roadside beacon may broadcast signed messages that provide warnings to autonomous vehicles of dangerous road conditions. In this case, an organization 110 may be a traffic regulating entity that also receives messages from the roadside beacon. In another example, a named entity device 130 may be a smart-home appliance that can automatically order an item from a retailer, which is another example of an organization 110. In a third example, a named entity device 130 may be a user device 160 that has a registered account with an organization 110. The implementations and use cases of the environment 100 are not limited to the explicit examples discussed in this disclosure.

Various named entity devices 130 may have different relationships with an organization 110 and may establish connections with more than one organization 110. In one example, a named entity device 130 may be made and operated by an organization 110. For example, an industrial organization may operate various sensors in a facility. The sensors may each be an IoT device that is an example of a named entity device 130. In the cases where a named entity device 130 is part of an organization's resources, the named entity device 130 may be associated with an identity record under the namespace of the organization 110. For example, the named entity device 130 may be associated with a unique identifier 123424.sensor._devices.example.com, under the domain Example Corp. In some cases, a named entity device 130 is not part of the organization 110 but may communicate with the organization API 116. A customer of the organization 110 may possess a named entity device 130 that is registered with the organization 110 and has a credential for the authentication of the named entity device 130. For example, a smart appliance may be registered with different retailers and has different API credentials to order items directly from the retailers.

A named entity device 130 may have some or all of the components of an example computing device illustrated in FIG. 9. The types of components equipped in a named entity device 130 may vary, depending on its type. A named entity device 130 may a server computer, a personal computer, a portable electronic device, a wearable electronic device, an IoT device (e.g., a sensor), smart/connected appliance (e.g., a refrigerator), dongle, etc. An IoT device may also be referred to as an Internet connected device. The processing power of named entity devices 130 may vary and may be limited for certain types. For example, certain specialized IoT devices may be low-power devices that have limited processing power to reduce cost and power consumption. Certain specialized IoT devices may also be pre-programmed with certain computer code that enables the devices to communicate using certain communication protocols (e.g., UDP (User Datagram Protocol)) but not other protocols (e.g., TCP (Transmission Control Protocol)). In some embodiments, some IoT devices may include a memory that can store sensitive information, such as API credentials, but may not have sufficient security mechanisms to safeguard the information.

In some embodiments, a named entity device 130 may include a private key 132 and a corresponding public key that are generated based on public key infrastructure (PKI). The private-public key pair may be used to authenticate the named entity device 130. For example, the public key may be saved in a publicly accessible source such as a DNS record corresponding to the named entity device 130. The named entity device 130 may generate a digital signature by encrypting a message using the private key 132. A party in communication with the named entity device 130 may authenticate the message sender using the public key of the named entity device 130. In some embodiments, both the private key 132 and the corresponding public key are saved in the named entity device 130. The private key 132 may be saved in a hardware secure element of the named entity device 130 such as a trusted platform module (TPM). The hardware secure element safeguards the private key 132 and performs encryption and decryption functions. The hardware secure element may be a secure cryptoprocessor chip. In some embodiments, the safeguard of the private key 132 and the cryptographic functions may also be performed by software. The public key may be stored on the named entity device 130 and published in a namespace record (e.g., DNS record) at a location which may be referred to as DIDN-ID.

The third-party server 140 is a computing server that provides various services on behalf of the organization 110 and the named entity device 130. The third-party server 140 may also be referred to as a delegated server. The term "third party" may be viewed from the perspective of the organization 110, which may delegate certain tasks and services to another company, which has the expertise to perform the tasks and services. For example, the organization 110 may be a customer of the third-party server 140. The services provided by the third-party server 140 may include authentication responses on behalf of organizations 110, credential escrow service for named entity devices 130, policy distribution on behalf of organizations 110, secure software distribution to named entity devices 130, secure information distribution to named entity devices, and other tasks that may be related to security, management and services of named entity devices such as IoT devices. Some examples of services that may be performed by the third-party server 140 are discussed in further detail below with reference to FIG. 3.

Some or all of the components and hardware architecture of a third-party server 140 are illustrated in FIG. 9. Similar to the organization computing server 115, the third-party server 140 may be a server computer that includes software and one or more processors to execute code instructions to perform various processes described herein. The third-party server 140 may also be a pool of computing devices that may be located at the same geographical location (e.g., a server room) or be distributed geographically (e.g., cloud computing, distributed computing, or in a virtual server network).

The third-party server 140 may maintain a namespace zone 142 that is delegated by an organization 110. The namespace zone 142 may be referred to as a delegated namespace zone 142. The delegated namespace zone 142 may be a section of the namespace of an organization 110. The third-party server 140 provides management and database for the section of the namespace. An example delegated namespace zone 142 may be a delegated DNS zone that is hosted by the third-party server 140 on behalf of the organization 110. For example, an organization 110 with the domain "example.com" may delegate the zone of "_devices.example.com." to the third-party server 140 for the third-party server 140 to manage the identity records of certain devices of the organization 110. The delegated namespace zone 142 may include a database that stores identity records of various named entity devices 130.

While in this disclosure the namespace of an organization 110 is described using domain names as examples, other forms of the namespace are also possible. For example, the namespace may be in the form of a file path, XML, Java namespace, uniform resource name, network addresses (e.g., MAC addresses, IP addresses), and other suitable namespace formats. An organization 110 may also design a customized namespace. Various blockchains may also support different namespace formats and the namespace may be reserved for an organization 110 and recorded on a block of the blockchain.

In the system environment 100, there can be multiple independent organizations 110, each of which may be in communication with various kinds of named entity devices 130. Various organizations 110 may be of different natures and provide different products and services to their customers. The organizations 110 may be customers of the third party which operates the third-party server 140 and may delegate the third-party server 140 to perform different tasks to various extents. Each organization 110 may specify a different set of rules and policies when interacting with the third-party server 140 and in controlling how the third-party server behaves when performing the delegated tasks.

A policy consumer 136 may be a device or an entity that consumes a policy set by an organization 110 or by the third-party server 140. A policy consumer 136 may be a named entity device 130, but may also be a user or a device that is anonymous. In some embodiments, a policy may be set by the organization 110 and be distributed and provisioned by the third-party server 140. A policy may define how a device should behave in certain situations. For example, a policy may be a communication policy or protocol that defines how an IoT device may communicate with other devices generally or in specific situations. A policy may also take the form of a set of instructions that may define or alter the behavior of a device. The policy may also take the form of a policy plugin that may enable a device with the plugin to behave in a standard way or be compliant with a standard.

A user device 160 is a computing device that may transmit and receive data via the networks 190. Some or all of the components of a user device 160 is illustrated in FIG. 9. The user device 160 also may be referred to as a client device or an end user device. Various user devices 160 may belong to different parties or may be associated with individual end users. Administrative devices 114, transmitter devices 170, and recipient devices 180 may be examples of user devices 160. A user device 160 includes one or more applications and user interfaces that may communicate visual, tactile, or audio elements of the applications. The user devices 160 may be any computing devices. Examples of such user devices 160 include personal computers (PC), desktop computers, laptop computers, tablets (e.g., iPADs), smartphones, wearable electronic devices such as smartwatches, or any other suitable electronic devices.

A user may be personnel, an expert, an outside contractor, a customer, or otherwise an end user associated with an organization 110 or someone who is unrelated to any organizations 110. The user also may be referred to as a client or an end user and may control a named entity device 130. A user, through a user device 160, may communicate with other components in the system environment 100 in various suitable ways. For example, a user device 160 may include a user-side software application provided by an organization 110 or the third-party server 140. The user device 160 may interact with those components using a graphical user interface (GUI) of the software application. For example, an administrator (an example of a user) may specify the configurations of the authentication rules using a GUI of an application provided by the third-party server 140. An application may be a web application that runs on JavaScript or other alternatives. In the case of a web application, the application cooperates with a web browser to render a front-end interface. In another case, an application may be a mobile application. For example, the mobile application may run on Swift for iOS and other APPLE operating systems or on Java or another suitable language for ANDROID systems. In yet another case, an application may be a software program that operates on a desktop computer that runs on an operating system such as LINUX, MICROSOFT WINDOWS, MAC OS, or CHROME OS. In other cases, a user may communicate with the third-party server 140 by causing an administrative device 114 of an organization 110 to communicate directly to the third-party server 140, for example, via features such as Application Programming Interface (API) or like technologies such as webhooks. In other cases, a user device 160 may be a transmitter device 170 or a recipient device 180. For example, end users may send messages to each other and the messages may be authenticated through information provided by third-party server 140.

In the system environment 100, a transmitter device 170 and a recipient device 180 may be respectively the message transmitter and the message recipient. Messages are not limited to a particular type or format. Messages can be emails, text messages, instant messages, social media messages (e.g., FACEBOOK messages, posts, and TWEETS), RSS feeds, push notifications, Internet packets, data link frames, or any suitable message payloads. Various transmitter devices 170 may be anonymous or may be named entity devices 130 whose identities are defined under different domains or sub-domains. A transmitter device 170 may be an example of named entity device 130 that is under the control of an organization 110. Messages sent from this transmitter device 170 may be authenticated based on the rules set by the organization 110. For transmitter devices 170 that are controlled by an organization 110 that has a domain, e.g., example.com, the identifiers of the transmitter devices 170 may be under the sub-domain such as _devices.example.com, whose namespace may be delegated to the third-party server 140. Hence, when a recipient device 180 receives a message, the recipient device 180 may send an authentication query to the namespace server associated with the organization 110. The third-party server 140 may operate part of the namespace related to devices.example.com on behalf of the organization 110.

The networks 190 may include multiple communication networks that provide connections to the components of the system environment 100 through one or more sub-networks, which may include any combination of local area and/or wide area networks, using both wired and/or wireless communication systems. In one embodiment, a network 190 uses standard communications technologies and/or protocols. For example, a network 190 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 190 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 190 may be represented using any suitable format, such as hypertext markup language (HTML), extensible markup language (XML), JavaScript object notation (JSON), structured query language (SQL). In some embodiments, all or some of the communication links of a network 190 may be encrypted using any suitable technique or techniques such as secure sockets layer (SSL), transport layer security (TLS), virtual private networks (VPNs), Internet Protocol security (IPsec), etc. The network 190 also includes links and packet switching networks such as the Internet.

In some embodiments, a transmitter device 170 and a recipient device 180 may not transmit or receive messages directly through the networks 190. Instead, a message delivering server 176 and a message receiving server 186 transmit and receive messages on behalf of the devices. For example, in the setting of email communications, the message delivery server 176 sends emails on behalf of the transmitter device 170. The message delivery server 176 may include one or more computing systems, which may be configured similarly to the computing system described with reference to FIG. 9. As an example, the message delivery server 176 may be a mailing list server, a bulk mailer provider that sends emails on behalf of a domain, a transactional email system managed by a third-party that sends emails on behalf of a domain, or a security system that scans emails on behalf of a domain. The message delivery server 176 may send the email instead of the named entity device 130 so that the message delivery server 176 may provide additional processing or functionality to the email. In one embodiment, the email sender 114 uses standard mail protocols, such as Simple Mail Transfer Protocol (SMTP). SMTP supports various features. U.S. Pat. No. 9,762,618, entitled "Centralized Validation of Email Senders via EHLO Name and IP address Targeting," patented on Sep. 12, 2017, is incorporated by reference for all purposes. Likewise, in the setting of email communications, a message receiving server 186 may be an email server on the recipient end.

In the setting of IoT device communications, some IoT devices may be equipped with long-range communication capabilities such as LTE or 5G so that the devices can communicate with each other, with transmitter devices 170, and the third-party server 140 directly through the Internet. On the other hand, in some embodiments, some IoT devices may only be equipped with limited communication capability that is confined to a smaller area such as a local area network. In those cases, the IoT devices may rely on message brokers for the communications with transmitter devices 170 and the third-party server 140. In such cases, various message brokers may be examples of message delivering servers 176 and message receiving servers 186.

In various embodiments in this disclosure, for simplicity and unless otherwise specified, the communication between a transmitter device 170 and a recipient device 180 may be described as a message transmitter transmitting a message to a message recipient. This description should include the situation where a transmitter device 170 directly sends a message to a recipient device 180 and the situation where a message delivering server 176 and a message receiving server 186 are involved (e.g., in the context of email communication). The authentication may be performed at the recipient device 180 and/or at the message receiving server 186. For simplicity, a message recipient that sends an authentication query to the third-party server 140 may refer to a named entity device 130, a recipient device 180 or a message receiving server 186, depending on the situation and the communication protocol used in transmitting the message. A message recipient may also be referred to as an authenticator. Likewise, a message transmitter may refer to a named entity device 130, a transmitter device 170 or a message delivering server 176.

A message described in this disclosure does not always need to be a human-readable or machine-readable text string or communication. A message may be a block of data, a payload, an executable set of instructions, human-written text, or any other suitable information that may be carried by one or more packets, data frames, or other suitable units of data, with or without control information, structured or unstructured, encrypted or not, and indexed or not.

Example Organization Computing Server

Figure 2:
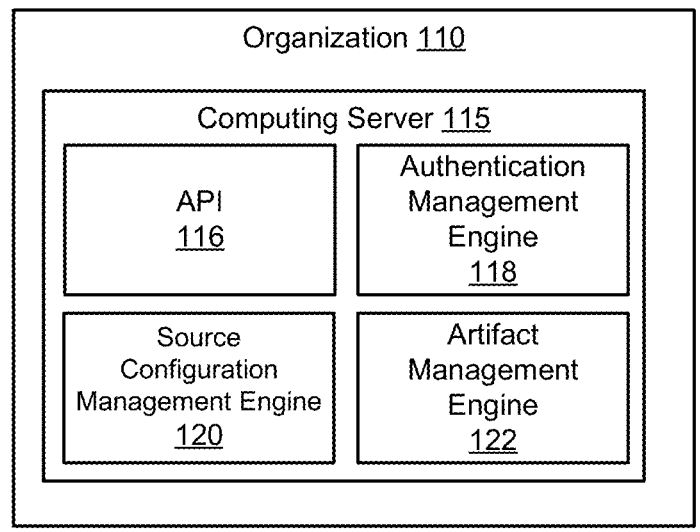
FIG. 2 is a block diagram illustrating various components of an example organization computing server, in accordance with some embodiments.

FIG. 2 is a block diagram illustrating an example organization computing server 115, in accordance with some embodiments. In some embodiments, the computing server 115 may include an application programming interface (API) 116, an authentication management engine 118, a source configuration management engine 120, and an artifact management engine 122. In various embodiments, the computing server 115 may include fewer or additional components. The computing server 115 also may include different components. The functions of various components in computing server 115 may be distributed in a different manner than described below. Moreover, while each of the components in FIG. 2 may be described in a singular form, the components may present in plurality.

The components of the computing server 115 may be embodied as software engines that include code (e.g., program code comprised of instructions, machine code, etc.) that is stored on an electronic medium (e.g., memory and/or disk) and executable by a processing system (e.g., one or more processors and/or controllers). The components also could be embodied in hardware, e.g., field-programmable gate arrays (FPGAs) and/or application-specific integrated circuits (ASICs), that may include circuits alone or circuits in combination with firmware and/or software. Each component in FIG. 2 may be a combination of software code instructions and hardware such as one or more processors that execute the code instructions to perform various processes. Each component in FIG. 2 may include all or part of the example structure and configuration of the computing machine described in FIG. 9.

The API 116 of the organization 110 provides an interface for various devices in the environment 100 to communicate with the organization computing server 115. In some cases, certain communications (e.g., certain predefined API requests) may be open to any devices. In other cases, certain communications may require credentials in order to establish connections. For example, in some embodiments, the credential associated with a named entity device 130 may be provided to the API 116. In response, the computing server 115 may generate an ephemeral session token for the named entity device 130 to communicate with the computing server 115 via the API 116 throughout the lifetime of the session token. At the expiration of the session, a new session token may be generated upon proper authentication. The API 116 may be of any suitable type, such as REST (representational state transfer), SOAP (Simple Object Access Protocol), RPC (remote procedural call), or another suitable type. The API 116 may have an identity record on a DNS, whether it is managed by namespace server 112 or the delegated namespace zone 142 managed by the third-party server 140.

The authentication management engine 118 of the computing server 115 may manage the credentials of devices that are registered with the organization 110. The credential of a device may be associated with the identity of the device or may also be a user credential (e.g., user account name and password) associated with a natural person that possesses the device. A device may be registered with the organization 110. For example, the authentication management engine 118 may issue a new credential to a newly registered device or store a new credential entered by a newly registered device. The authentication management engine 118 may also manage existing credentials stored in the computing server 115. The authentication management engine 118 may verify the credentials provided with an incoming message (e.g., an API request) from a device. In some implementations, if a credential is verified, the authentication management engine 118 may generate a session key for the communication session between the device and the computing server 115.

The credentials for communicating with the API 116 may be text-based. For example, the credential for a named entity device 130 may include a key identifier and a secret key, which may also be respectively a username and a password. In the context of a named entity device 130, the key identifier (username) may be a string that uniquely identifies the device 130 among the services provided by the computing server 115. The key identifier may also be used as a record locator for retrieving the named entity's credential and any other contextual authentication information. By way of example, a key identifier for a sensor IoT device may be 123.sensor._device.example.com. The secret key (password) may be another string or a file that is used to authenticate the named entity device 130. In some embodiments, a named entity device 130 may generate a cryptographic signature on a string of bits (e.g., a nonce) using the private key 132. The digital signature may be provided to the computing server 115 for the computing server 115 to decrpyt, using the public key of the named entity device 130, the signature to regenerate the string of bits. Upon verifying the string of bits, the named entity device 130 proves its possession of the private key 132 and is authenticated.

In some embodiments, the credential of a named entity device 130 may not be possessed by the named entity device 130. Instead, the credential is deposited in the credential escrow management engine 138 of the third-party server 140 in a manner and for reasons that will be further discussed below.

The source configuration management engine 120 and the artifact management engine 122 may be version control engines that manage the source code, libraries, library objects, artifacts, and other binary file objects in the computing server 115. The source configuration management engine 120 may manage various source code repositories for the computing server 115 to control the API 116 and the authentication management engine 118. The source code may include or be compiled into instructions, when executed by one or more processors of the computing server 115, cause the processors to perform various processes described herein. Example source configuration management engine 120 may manage repositories that are hosted on GITHUB, BITBUCKET, GITLAB, SOURCEFORGE, etc. The artifact management engine 122 may manage the libraries, library objects, artifacts, and other binary file objects. The artifact management engine 122 may automatically fetch updates to various libraries and clean up libraries. The artifact management engine 122 may also tag various libraries and objects with searchable metadata and indexes. Example artifact management engine 122 may include services provided by companies such as ARTIFACTORY.

Example Third-Party Server

Figure 3:
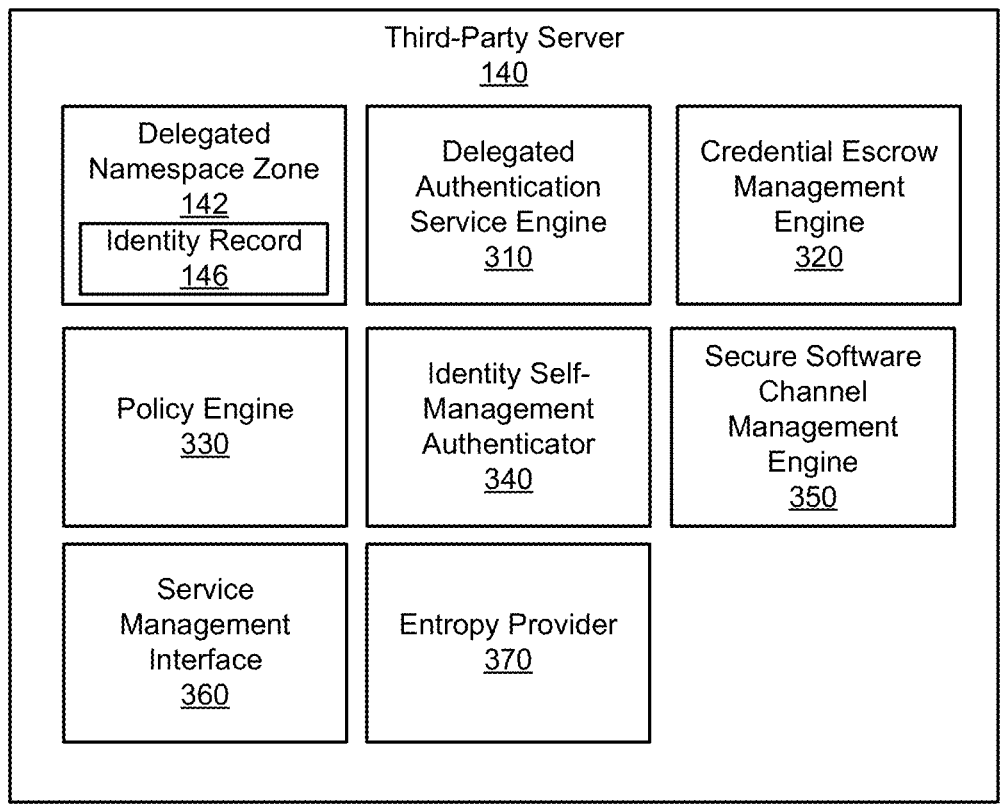
FIG. 3 is a block diagram illustrating various components of an example third-party server, in accordance with some embodiments.

FIG. 3 is a block diagram illustrating an example third-party server 140, in accordance with some embodiments. In some embodiments, the third-party server 140 may include a delegated namespace zone 142, a delegated authentication service engine 310, a credential escrow management engine 320, a policy engine 330, an identity self-management authenticator 340, a secure software channel management engine 350, a service management interface 360, and an entropy provider 370. In various embodiments, the third-party server 140 may include fewer or additional components. The third-party server 140 also may include different components. The functions of various components in third-party server 140 may be distributed in a different manner than described below. Moreover, while each of the components in FIG. 3 may be described in a singular form, the components may present in plurality.

The components of the third-party server 140 may be embodied as software engines that include code (e.g., program code comprised of instructions, machine code, etc.) that is stored on an electronic medium (e.g., memory and/or disk) and executable by a processing system (e.g., one or more processors and/or controllers). The components also could be embodied in hardware, e.g., field-programmable gate arrays (FPGAs) and/or application-specific integrated circuits (ASICs), that may include circuits alone or circuits in combination with firmware and/or software. Each component in FIG. 3 may be a combination of software code instructions and hardware such as one or more processors that execute the code instructions to perform various processes. Each component in FIG. 3 may include all or part of the example structure and configuration of the computing machine described in FIG. 9.

The third-party server 140 is a computing server that provides various services and performs different tasks on behalf of multiple unrelated organizations 110. Each organization 110 may delegate a section of the organization's namespace to the third-party server 140 as the delegated namespace zone 142. The delegated namespace zone 142 may correspond to a delegated DNS server, a blockchain server, a distributed database server, another suitable server publicly accessible server, or any combination of those servers. If the delegated namespace zone 142 is a delegated DNS, the third-party server 140 is trusted because of the delegated nature of managing DNS zones. Also, the records in DNS may be cryptographically signed to ensure that the records are authoritative and have not been tampered with. If the delegated namespace zone 142 is a namespace under a blockchain, the delegated namespace zone 142 is trusted because the records are tamper-evident.

In various embodiments, the delegated namespace zone 142 may include one or more of the following traits: (1) authenticated (2) delegated and/or (3) able to handle arbitrary content. DNS is one example of such a database. First, DNS allows the known entity to manage its own records within the database. Second, DNS enables hierarchical delegation via NS records so that the known entity can provide others authenticated access with permission on its behalf of a subset of the database. For example, an Example Corp is responsible for maintaining all the records under example-.com, including www.example.com. Because the namespace may be many layers deep, Example Corp may wish to organize its device identities under a specific branch of the DNS, such as "_devices.example.com". Example Corp may delegate the sub-domain to any party, such as the third-party server 140. Third, arbitrary data, such as text-based, encrypted or not, data can be stored in DNS records. In addition to name-to-IP address, DNS can host specialized record types for public keys and certificates (DANE/TLSA, RFC 6698), and DKIM (RFC 6376), which puts a public key in a freeform TXT record. In some embodiments, encrypted data that is encrypted with the public key of a named entity device 130 may be included in a DNS record for the named entity device 130 to retrieve.

In some embodiments, the delegated nature of a namespace system may allow organizations 110 such as Example Corp to delegate special-purpose parts of their namespace (e.g., DNS hierarchy) to a specialized third-party service provider (3PSP), such as the third-party server 140. For instance, Example Corp may delegate a section of its DNS tree (e.g. "_devices.example.com") to the third-party server 140. The namespace falls under example.com, which may be hosted on computing servers owned by Example Corp, but the _devices.example.com section of the namespace may be delegated by Example Corp to be hosted on the infrastructure of the third-party server 140 as the delegated namespace zone 142.

Although the discussion focuses on the use of DNS as the example distributed database, systems other than DNS may also be used. For example, the Inter-Planetary File System ("IPFS") may also be used. A third alternative example is a blockchain platform supporting application code submissions. While the discussion in this disclosure may focus on the use of DNS for the database, the systems and processes described can be applied to other namespace contexts and implementations. For the rest of the disclosure, even though the descriptions may focus on the DNS, other namespace systems may also apply in a similar manner unless specified otherwise.

The delegated namespace zone 142 may include a plurality of identity records 146. An identity record 136 may be a record that corresponds to a named entity device 130. An identity record 136 may include a unique identifier of a named entity device 130 (e.g., a name), authentication context information, and/or any information that may be used to authenticate the named entity device 130 or verify certain information associated with the named entity device 130. In some embodiments, the identity record 136 may include information that is signed by the private key 132 of the named entity device 130 so that the signer of the information can be easily verified by the device's public key.

While identity records 136 are sometimes discussed in this disclosure with the examples of identifiers or contextual information, the identity record 136 does not need to include any of those examples and may include other types of information that may be directly related to the identity of the named entity device 130. Each organization 110 may include many identity records and may provide a set of those records to the third-party server if the organization 110 decides that the named entity devices 130 correspond to those provided records should be discoverable.

A unique identifier, which may be part of an identity record 146, may be used to identify a named entity device 130 and may be used as a record locator for retrieving the named entity's credential, other contextual authentication information, or other identity information related to the named entity device 130. In some embodiments, an identifier may be in a format under the namespace of the organization 110. An example identifier can be 123.sensor.devices.example.com. In other embodiments, the identifier may also be any text string, arbitrary or not. In some embodiments, the identity records 136 may be saved as key-value pairs in which the identifiers serve as the keys, and the other information are the values. Other formals (e.g., tabular, CSV, tab delimiter, XML, JSON) to store the identity records 136 are also possible.

The third-party server 140, through the delegated authentication service engine 310, may provide the delegated authentication service on behalf of an organization 110. The delegated authentication service engine 310 may perform different authentication-related services, including providing authentication responses to message recipients, performing contextual authentication, and may perform certain authentication on behalf of some message recipients. On behalf of an organization, the third-party server 140 may receive an authentication query from a message recipient. The authentication query may include certain metadata of the message or an identifier of the transmitter, which claims to be associated with an organization 110. The identifier in the authentication query may be the same as an identifier stored in an identity record 136 or may include data metadata that allow the third-party server 140 to retrieve the identifier stored in the identity record. In response, the third-party server 140, as an operator of the delegated namespace zone 142, provides the identity record 136 or part of the identity record 136 to the message recipient as the authentication response.

An authentication query may be transmitted from a message recipient, which receives a message purportedly sent from a named entity associated with an organization 110. If the third-party server 140 operates as part of a DNS server, the authentication query may be a DNS query. If the third-party server 140 operates as other types of servers such as a blockchain server, the query may be in other suitable formats. For example, in an embodiment where a blockchain is used, the third-party server 140 may include an oracle machine to provide information to a smart contract saved in the blockchain for the generation of the authentication response. Other implementations are also possible.

On behalf of the organization 110, the delegated authentication service engine 310 may also provide services related to authentication using context information. The third-party server 140 may receive authentication context configurations from various organizations 110. Each organization 110 may have a different setting on the authentication context. The third-party server 140 may translate the authentication context configuration information to a formatted DNS record and publish the record as a resource record under the sub-domain. DNS allows the publication of multiple resource records under the same name. Each organization 110 may manage its own authentication context information and settings via an API or an application provided by the third-party server 140, such as through the service management interface 360. The third-party server 140 translates the authentication context information and settings into namespace records (e.g., DNS records) for publication.

Authentication context information may include credentials (e.g., one or more public keys or another suitable authentication credential of a named entity device 130) and contextual metadata (such as time, location, etc.) that may be needed for a message recipient to authenticate a message purportedly transmitted from the named entity device 130, and other information needed for the authentication. Authentication context information may also be an example of a type of identity records 136. The format of the authentication context information may depend on the type of messages being transmitted. For example, in the context of emails, the format may be in compliance with one or more established standards such as SPF (Sender Policy Framework), DKIM (DomainKeys Identified Mail), TLSA (Transport Layer Security Protocol), DANE (DNS-based Authentication of Named Entities). In other contexts, the format may be in compliance with other protocols that are in various layers such as the application layer, transport layer, or Internet layer. A message recipient may send an authentication query. Upon the right conditions under the rules specified by the named entity device 130, the third-party server 140 provides the message recipient with the authentication context information.

Complexity in communications arises from the contexts constraining the communications. Besides verifying the credential, a message recipient may also verify other contexts. Examples of such contexts may include time (now, not later), location (here, not there), directionality (one way or two way), means (e.g. mobile phone not email), sequencing (in a chain of communications, does order matter?), topology (one-to-one, one-to-many, many-to-one), modifiability (can the communications be modified?), modifications (are they allowed? disallowed?), and form of ID (the primary authenticated key into the database, for DNS this is a domain, for other datastores such as IPFS and blockchain, the keys are different). Non-sub stantive constraining context or limitations to the communications may be managed by the third-party server 140. Further examples of contexts include amplification, aggregation, summarization, shelf life, and revocation. Another example is a computationally intensive context—one requiring specific software developed and installed to perform these computations.

Authentication context settings, provided by an organization 110 and managed by the third-party server 140, may specify what type of information will be provided and how the third-party server 140 should respond when an authentication query is received. For example, in one setting, an organization 110 may specify that a named entity's public key will be forwarded when an authentication query is received. In another example, an organization 110 may specify additional context information (e.g., time, location) for the third-party server 140 to forward. In yet another example, an organization 110 may allow the third-party server 140 to perform certain authentication processes on behalf of a message recipient, such as in a circumstance where the message recipient is a device that may lack the general processing power to perform certain authentication. In yet another example, an organization 110 may require the third-party server 140 to perform authentication of the message recipient before its own name entity's authentication context information is forwarded.

In some embodiments and based on the setting of an organization 110, authentication may be mutual. The third-party server 140 may authenticate the message recipient before any authentication context information is forwarded to the message recipient for the recipient to authenticate the message that is purportedly transmitted under the domain of the named entity device 130. The third-party server 140 may verify the digital signature of the message recipient that may be included in an authentication query.

In some embodiments, the delegated authentication service engine 310 may perform part of the authentication process on behalf of a message recipient. Communications among certain types of IoT devices may be an example that may utilize this feature. Certain IoT devices may be sensors or other devices that have limited processing power. They may include a hardware circuit for decrypting and encrypting cryptographic keys and have limited processing powers designed for performing certain limited actions as a sensor. Those IoT devices may be message recipients that receive information from a beacon that broadcasts the message over radio waves in the vicinity. In some cases, a malicious party may record the broadcast of a message and playback at another location in an attempt to manipulate IoT devices that are not the intended recipients. An IoT device, upon receiving the message, may transmit an authentication query to the third-party server 140. An organization 110 may specify that the third-party server 140 can authenticate the message on behalf of certain devices. For example, the third-party server 140 may verify the location information metadata (an example of contextual evaluation) of the sending location of the message in order to confirm that the message was sent from a legitimate beacon. The third-party server 140 may transmit a response that includes the public key of a named entity device 130 (e.g., the message transmitter) and contextual evaluation result over the Internet that may include DNSSEC (Domain Name System Security Extensions) and TLS (Transport Layer Security) to ensure the response is securely delivered to the IoT device.

The credential escrow management engine 320 may store confidential credentials (e.g., username and password) of named entity devices 130 and manages the credentials on behalf of the devices 130. In some cases, certain named entity devices 130 may not be complex enough to include the hardware and software (or simply it is too costly to include those secure elements) to safeguard certain confidential credentials, such as text-based credentials that may be used as the API credentials to communicate with the API 116. Instead of storing the credentials in each named entity device 130, an organization 110 may deposit the credentials of devices 130 that are registered with the organization 110 to the credential escrow management engine 320. The credential escrow management engine 320 may store an association among (1) the identifier of the named entity device 130 saved in the DNS record associated with the device 130, (2) the named entity device's API key identifier (e.g., API username, which may or may not be the same as the identifier in the DNS record), and (3) the device's API secret key (e.g., API password). In some embodiments, the association may also include the named entity device's public key. In one embodiment, to enable the named entity device 130 to communicate with the API 116, the credential escrow management engine 320 may provide an ephemeral credential (e.g., a session token) for a named entity device 130 to communicate with the API 116. This limits the exposure of a compromised named entity device 130.

By way of example, the credential escrow management engine 320 may provide a credential of a named entity device 130 to the organization's API 116 to perform the initial authentication on behalf of the device. A named entity device 130 that intends to initiate a communication with the API 116 may provide a request to the third-party server 140. The request may include an identifier of the named entity device 130, such as the identifier in the DNS record of the named entity device 130. In response, the credential escrow management engine 320 may provide the named entity device's API credential (in escrow of the third-party server 140) to the API 116. The API 116, upon authenticating the credential, may generate an ephemeral credential such as a session token for the named entity device 130 to establish a communication session with the API 116. The API 116 may transmit the ephemeral credential to the third-party server 140. The credential escrow management engine 320 may transmit a query to a DNS (or another namespace system) that includes the DNS record of the named entity device 130. The DNS record may include the public key of the named entity device 130. The credential escrow management engine 320 may use the public key to encrypt the ephemeral credential. The credential escrow management engine 320 may publish a namespace record (e.g., DNS record) at the namespace associated with the organization 110. The namespace record contains the encrypted ephemeral credential for the named entity device 130 to retrieve the ephemeral credential at the namespace system. The namespace record may also include a time to live entry that corresponds to a lifetime of the session token. Upon retrieval, the named entity device 130 may use its private key to decrypt the encrypted ephemeral credential. While in this disclosure the credential for API 116 is often described as a time-bound credential, in some embodiments the encrypted credential may also be non-time-bound. For example, the distribution of the credentials may include the distribution of text-based credentials from the third-party server 140 to a named entity device 130. Some APIs do not support the use of a time-bound session token and rely on key/secret (e.g., username/password). The credentials may be stored in the third-party server 140 and may be sent to the named entity device 130 on demand. Further details of the credential escrow services by the third-party server 140 and variations in different embodiments will be discussed with reference to FIG. 4 through FIG. 8.

The policy engine 330 manages and distributes policies for application interaction patterns. Policies may be a set of rules that define or alter the behaviors of a policy consumer 136. A policy may be defined and initiated by the organization 110. The organization 110 may transmit the policy to or design the policy at the third-party server 140. The policy engine 330 may distribute the policy based on criteria set by the organization 110. The distribution of the policy may be through a direct communication, such as a message payload to be sent to a policy consumer 136, or via a namespace record. For example, the policy, encrypted or not, may be posted on a DNS record for devices to download.

The identity self-management authenticator 340 may perform authentication for the self-rotation of certificates. The identity of a named entity device 130 may be asserted by using the private key to decrypt a message encrypted the device's public key, which may be included in a DNS record. For the DNS record of a named entity device 130, the public key or certificate may be removed after a predetermined period to allows an ephemeral PKI-based identity. The identity self-management authenticator 340 may authenticate the ephemeral identity. For instance, if a device has a core identity with name 123.edge._device.example-.com, with a public key at that record, the third-party server 140 may use that identity to establish ownership of (a) names under that place in DNS, which follows the natural hierarchical organization of the namespace, or (b) a delegated identity which may indicate the core identity by a specifically-formatted record in the namespace. For DNS, this may take the form of a TXT record which indicates the parent identity.

The prior example may allow a device at name 123.edge._device.example.com to establish a short-lived public key credential at _serviceclient.123.edge._device.example.com by virtue of the application being configured to allow devices to establish short-lived sub-identities in this fashion. The process of establishing this name-pubkey identity is described in the next example. The difference in this use case and the next being the method for indicating the authorized parent credential. With this method, it is naturally indicated by the hierarchy of the namespace. In the next, it is deliberately indicated within the namespace or in the application configuration.

The latter example may exist as two DNS records at the name 123.summarizer._device.anotherexample.com. One record is a TXT record which indicates 123.edge._device.example.com as the parent or core identity. The second record at 123.summarizer._device.

anotherexample.com may be a TLSA record which contains a public key. The TLSA record at 123.summarizer._device.anotherexample.com is expected to be frequently updated, and if it exceeds its expected lifetime without update, the record may be removed or 'tombstoned' (having unudable data placed in the record to indicate the identity's existence, but that it should not be trusted). Alternatively, it may make sense for the organization owning anotherexample.com to conceal from publication the parent identity of the device, for privacy reasons (maybe this is a medical device and example.com domain is known for producing a specific type of medical device). In the case where this privacy feature is desired, the third-party server 140 will provide a feature in the management application where the application may correlate the 123.summarizer._device.anotherexample.com device with 123.edge.example.com, for the purpose of authenticating the rotation of the public key.

The process of establishing an ephemeral public key credential at 123.summarizer._device.anotherexample.com may involve the device in possession of the identity as well as the 123.edge._device.example.com to (1) create or obtain a new key pair, (2) create a certificate signing request (CSR) associating the new public key and the 123.summarizer._anotherexample.com name, (3) use the private key associated with the 123.edge._device.example.com identity to generate a cryptographic signature of the CSR and a nonce, (4) transmit the signature, nonce, and CSR to the third-party server 140.

The third-party server 140 may (1) inspect the CSR and retrieve the name of the proposed identity, (2) determine (either by the TXT record or internal application configuration) that the parent identity for 123.summarizer._device-.anotherexample.com is 123.edge._device.example.com. (3) retrieve the public key associated with the 123.edge._device.example.com identity and use that public key to authenticate the CSR, nonce, and signature, (4) publish the new public key from the CSR, or a certificate containing the same, at the requested name (123.summarizer.anotherexample.com) for a limited time.

The secure software channel management engine 350 may manage the policy for secure software distribution. The secure software channel management engine 350 may correlate subscriber identifiers to universal identities and software channels. The secure software channel management engine 350 may maintain an internal reference of a named entity device's data, such as the device's identifier, public key, application type, device type, and other information that is associated with the device. The secure software channel management engine 350 may deliver software to various named entity devices 130 in a secure manner.

The secure software channel management engine 350 may maintain a database which correlates identities in the namespace with channels of software updates. The secure software channel management engine 350 may be analogous to subscription service where the channel periodically updates the most recent edition of a firmware bundle or configuration file. When the client device indicates its identity to the firmware management service (such such over HTTPS or MQTT) the firmware management service is able to correlate the device's identity with the appropriate software 'channel' and indicate to the client device the unique identifier of the current version of the software. The unique identifier may be a version tag (v1.0.1) or a computed hash, or some other way of uniquely indicating the current version of the subscription asset. This response may also contain the certificate or public key of the system that built and signed the versioned asset. When the device receives the version indicator (which may be encrypted using the client identity's public key) the device compares the current version of the asset as described by the third-party server 140 with the current version in use on the device. If there is a version mismatch, the device then requests the most recent version of the asset. third-party server 140 responds to this request by retrieving the signed asset from the artifact repository, and encrypts it with the public key associated with the requesting device's identity. This may be direct encryption using a public key, or it may be a key-wrapping approach where a symmetric key is used to encrypt the payload, and the symmetric key is encrypted by the public key. The symmetric key should be randomly-generated for every download, to prevent the analysis of multiple asset update actions using the same symmetric key, and to prevent the correlation of device capabilities by correlating the metadata associated with the device update process (like the hash of the encrypted payload). When the device receives the update, the device uses its own private key to unpack the update object. The device may use a certificate and signature embedded in the update object or (if provided) the same provided via the initial update request interaction to verify the software download.

The service management interface 360 may be an interface for an organization administrator to change settings with respect to various engines such as to change the authentication policy in the engine 310, to upload credential to the credential escrow management engine 320, define various policies for distribution by the policy engine 330, etc. The service management interface 360 may include a portal for professional developers, an API, and a user-friendly portal for layman use. The service management interface 360 may take different forms. In one embodiment, the service management interface 360 may control or in communication with an application that is installed in an administrative device 114. For example, the application may be a cloud-based SaaS or a software application that can be downloaded in an application store (e.g., APPLE APP STORE, ANDROID STORE). The service management interface 360 may be a front-end software application that can be installed, run, and/or displayed at an administrative device 114. The service management interface 360 also may take the form of a webpage interface of the third-party server 140 to allow organization administrators to access data and results through web browsers. In another embodiment, the service management interface 360 may not include graphical elements but may provide other ways to communicate with organization administrators, such as through APIs.

The entropy provider 370 may be a specialized piece of hardware, software, or a combination that produces high-quality randomized bits for various devices, such as certain IoT devices or other named entity devices that may not be equipped with the component to generate high-quality entropy. Randomized bits may be used to create high-quality cryptographic keys. However, truly randomized bits may be difficult to generate using only computational algorithms. The entropy provider 370 may refer to certain real-world randomized events such as physical phenomenon that is expected to be random. The entropy provider 370 may provide entropy to a named entity device 130 for the device 130 to generate cryptographic keys. In some cases, a named entity device may be a provisioning device. The entropy provider 370 may transmit high-quality entropy to the provisioning device. In turn, the provisioning device uses the entropy to generate cryptographic keys and provision a new device with the keys.

Example Credential Escrow Management

Figure 4:
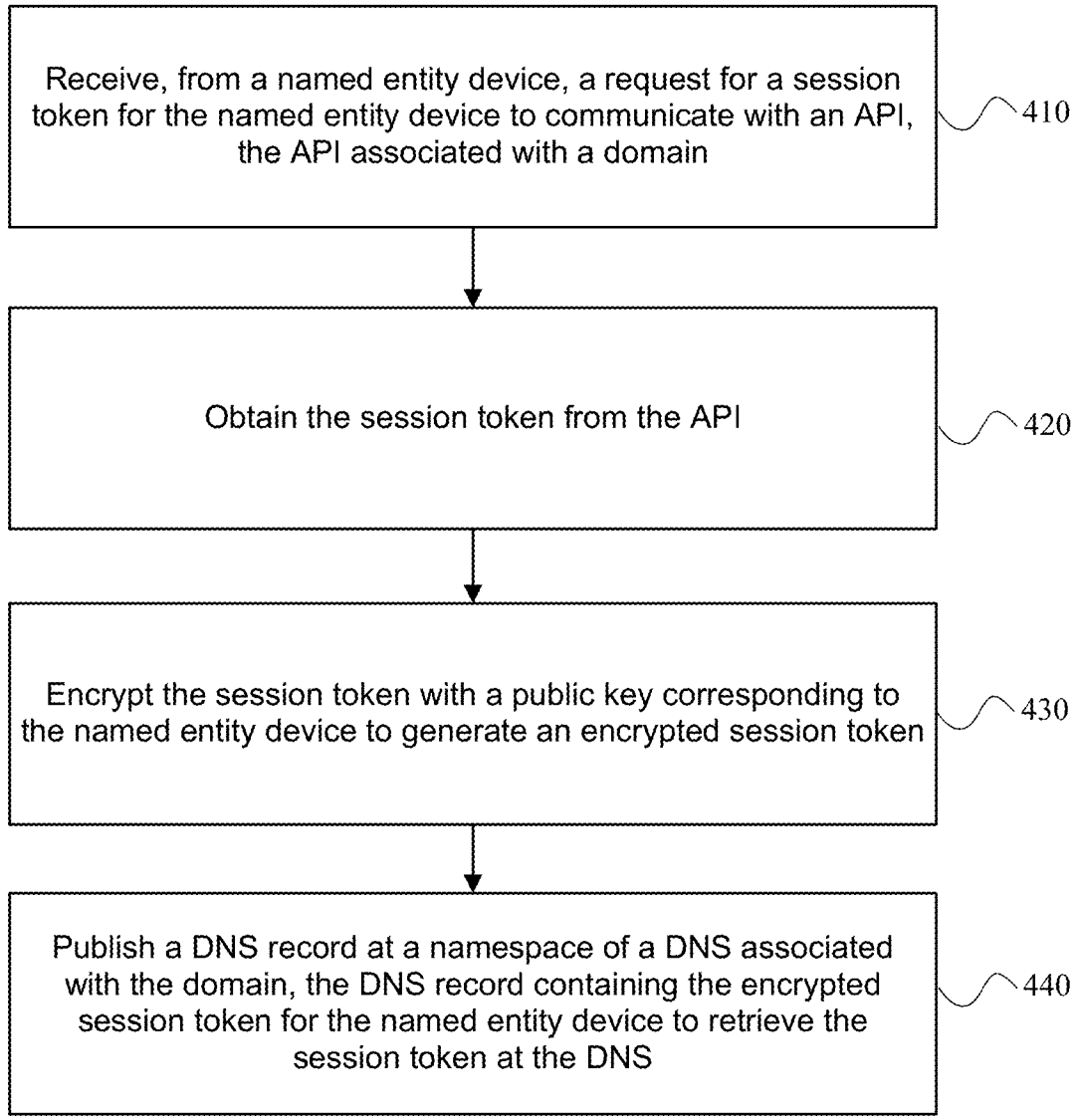
FIG. 4 is a flowchart depicting an example process for obtaining a session token by the third-party server on behalf of a named entity device, in accordance with some embodiments.

FIG. 4 is a flowchart depicting an example process 400 for obtaining a session token by the third-party server 140 on behalf of a named entity device 130, in accordance with some embodiments. Managing time-bound information, such as RESTful (Representational State Transfer) application authentication tokens or other API authentication tokens, can be challenging for a server (e.g., API 116 of the computing server 115) and named entity devices 130. Services such as API 116, which are accessed by various clients, may issue credentials for the clients. The credentials for a client may include a key identifier and a secret key (e.g., a username and password). In communicating with a service such as the API 116, the credentials may be used to obtain a session token, which may be time-bound (e.g., expires after a period of time). The session token may be a randomly generated alphanumeric string of characters or other unique identifiers that can be used to identify the client to the service. A popular session token lifetime is fifteen minutes, after which the client will need to use the key identifier and the secret key to obtain another session token for continued interaction.

For a named entity device 130 to establish a communication session with the API 116, in some implementations the credentials of the named entity device 130 will need to be provided to the computing server 115 for the computing server 115 to generate a session token. However, different types of named entity devices 130 pose various degrees of security concerns in safeguards their own API credentials, which, unlike private keys that may be saved in the hardware secure elements, are often text-based and are conventionally saved in the devices' non-volatile memory. For example, some simple IoT devices may be easily tampered with due to the lack of security mechanisms. Incorporating additional security mechanisms to those devices may oftentimes be an unrealistic option given the cost, power and size constraints.

In some embodiments, to address the potential security issues, certain credentials of named entity devices 130 may be deposited to the third-party server 140 (e.g., to the credential escrow management engine 320) for the third-party server 140 to hold the credentials on behalf of the named entity devices 130. The third-party server 140 may be in compliance with more security protocols than the named entity device 130. For example, the third-party server 140 is in compliance with the state of art security standards and protocols such as SOC 2 Type2, FedRAMP As such, the credentials in escrow are better safeguarded compared to storing the credentials in individual named entity devices 130. This may also be a benefit with shared responsibility models where a device manufacturer trusts a secure hardware element to protect a private key, the third-party server 140 to protect the API key ID and secret, and the device manufacturer only needs to make sure that the hardware (apart from the secure element) is securely designed and that the device software avoids writing the time-bound session token to disk. This is a general reduction in risk to application security by minimizing the vectors available to attackers via a compromised device.

In some embodiments, the type of credentials deposited to the third-party server 140 may include a device's API credentials. In some embodiments, a named entity device 130 does not have the possession of text-based credentials such as API key identifier and secret key (which may also be referred to as API username and password) that are conventionally saved in the device's non-volatile memory. For example, the organization 110 may have a list of text-based credentials for a number of named entity devices 130 and may decide to deposit the list of credentials to the third-party server 140. The organization computing server 115 may also provide the named entity device's public key (or certificate) and the device's name in the device's DNS record (or another suitable namespace record) to the third-party server 140. The third-party server 140 may store an association of the API credential, the public key, and the name in the DNS record so that the third-party server 140 may use one type of record to retrieve other records (e.g., using the DNS name to retrieve the public key and API credentials).

In the registration process of a new named entity device 130, the named entity device 130 may provide its name in the DNS record to the organization computing server 115 for registration. Alternatively, or additionally, the device may be possessed by a natural person (user) who has an account with the organization 110. The user may log in to the account using the user's credential and register the named entity device 130 with the organization 110, such as by providing an identifier (e.g., the device's name in the DNS record) to the organization computing server 115. The organization computing server 115 may create a new username and password for the new named entity device 130. The new username may be the name on the DNS record, related to (e.g., derived from) the name on the DNS record, or has no relationship with the name on the DNS record. For example, in a situation where a user is involved, the device's credential may be the user account credential, although in another situation the device's credential and the user's credential may be different. The device credential may be used as the API credential to enable the device to authenticate with the API 116. Instead of transmitting the API credential to the named entity device 130, the organization computing server 115 may deposit the credentials to the third-party server 140.

The types of credentials and secrets that are deposited to the third-party server 140, maintained by the organization computing server 115, or retained by a named entity device 130 may vary depending on embodiments and the organization's decision. In some embodiments, the organization 110 may decide not to deposit the API credentials of the named entity devices 130. In such a case, the third-party server 140 may obtain a session token on behalf of a named entity device 130 in a manner that will be discussed in further detail below with reference to FIG. 7. For example, the API credentials for some named entity devices 130 may be the user account credentials. The organization 110 may not want to share provide the user account credentials to the third-party server 140. In some embodiments, instead of transmitting the public key value to the third-party server 140, the public key is saved in the DNS record of the named entity device 130. The organization computing server 115 may provide the third-party server 140 with the URI (uniform resource identifier) or URL (uniform resource locator) of the named entity device's public key record.

In some embodiments, the only type of secret credential that the named entity device 130 retains may be the private key 132. The private key 132 may be saved in a hardware secure element (or similar software secure element). The secure element usually performs cryptographic tasks such as encrypting or decrypting messages using the private key 132. The secure element may keep the value of the private key 132 in strict secret and may deny access to the value even by other components of the named entity device 130 itself. In such a case, the private key 132 is properly safeguarded by the named entity device 130. Since the values of API credentials will need to be provided to the organization computing server 115 to authenticate the named entity device 130, the API credentials are usually not saved in a secure element along with the private key 132.

A named entity device 130 may utilize the service of the third-party server 140 to establish a communication session with the API 116 of the organization computing server 115, in accordance with some embodiments. Referring to the process 400, the third-party server 140 may receive 410, from the named entity device 130, a request for a session token for the named entity device 130 to communicate with the API 116. The API is associated with the domain of the organization 110. Depending on embodiments, the request from the named entity device 130 may be transmitted in different forms. In some embodiments, the request may be a direct message from the named entity device 130 to the third-party server 140. In other embodiments, the request may take the form of a DNS query. For example, the organization 110 may delegate part of its DNS namespace to the third-party server 140 as the delegated namespace zone 142. In the delegated DNS zone, the third-party server 140 may publish various records representing the various clients of the API 116. One of the client DNS records may represent the named entity device 130. To initiate a communication session with the API 116, the name entity device 130 may transmit the request in the form of a DNS query for that client DNS record. In some embodiments, the request, whether it is a direct message, a DNS query, or another form, may be encrypted or signed. For example, the named entity device 130 may retrieve the public key of the third-party server 140 and encrypt the query using the public key. The third-party server 140 may use its private key to decrypt the request.

In response to receiving the request, the third-party server 140 may obtain 420 the session token from the API 116. The third-party server 140 may retrieve the identification information of the named entity device 130 included in the request, such as the name of the device as reflected in the DNS record of the device. Based on the identification information, the third-party server 140 may retrieve the appropriate information (e.g., API credential) that may be transmitted to the API 116 to authenticate the named entity device 130. Upon successful authentication, a session token is issued by the API 116 and transmitted to the third-party server 140. In some embodiments, instead of a time-bound session token, a non-time-bound credential, in place of or in addition to the session token, may also be retrieved by the third-party server 140 in this step.

In different embodiments, the way how the third-party server 140 obtains 420 the session token may vary, depending on the type of credentials that are deposited to the third-party server 140. For example, in some embodiments, the third-party server 140 is in possession of the API credentials of the named entity device 130 and has stored the credentials in a memory location of the third-party server 140. The third-party server 140 may retrieve the API credential corresponding to the named entity device. The third-party server 140 transmits the API credential to the API 116 for the API to generate a session token. The API 116 verifies the credential and authenticates the named entity device 130. If authentication is completed, the API 116 will issue a session token and transmit the token to the third-party server 140. In another example, the third-party server 140 may not possess the API credential. Instead, the third-party server 140 may provide basic identification information (such as the name of the named entity device on the device's DNS record) to the API 116. The organization computing server 115 may verify that the name is registered with the organization 110. If so, the organization computing server 115 may transmit the session token via the API 116. The organization computing server 115 may also periodically push refreshed session tokens to the third-party server 140.

The third-party server 140 may encrypt 430 the session token with the public key corresponding to the named entity device 130 to generate an encrypted session token. The third-party server 140 may obtain the public key in various ways. In some embodiments, the public key may be stored at the third-party server 140 as part of the credential escrow management. In some embodiments, the public key may be obtained from a DNS record associated with the named entity device 130. For example, the third-party server 140 may query the DNS associated with the operator of the named entity device 130. The DNS record of the named entity device 130 may include the name of the device and the public key corresponding to the private key 132 stored in the device. In some embodiments, the credential encrypted may also be text-based credential instead of a session token.

Notably, the DNS identity record for the named entity device 130 and the DNS identity record for the API client may be different DNS records. For example, a named entity device 130 may be operated by an operating party (which may or may not be the organization 110) and may be registered with the organization 110 (e.g., having API credential with the organization 110). The DNS identity record may be a record operated by the operating party and may include the public key and other identification information of the named entity device 130. In the case where the operating party is not the organization 110 or the third-party server 140, the organization 110 and the third-party server 140 may not have control of the DNS record of the device. On the other hand, the DNS identity record for the API client may be under a namespace that is a delegated sub-namespace (e.g., delegated namespace zone 142) that is managed by the third-party server 140. The organization 110, having a domain, delegates the sub-namespace to the third-party server 140. The DNS identity record for the API client may be set up for the named entity device 130 to query for the session token or other credentials in order for the device to establish a connection with the API 116.

The third-party server 140 may publish 440 a DNS record at the namespace of the DNS associated with the domain of the organization 110. For example, the DNS record may be the DNS identity record for the API client and the namespace may be the delegated namespace zone 142 managed by the third-party server 140. The DNS record contains the encrypted credential (e.g., session token, or text-based credential) for the named entity device 130 to retrieve the session token at the DNS. For example, the named entity device 130 may request a session token in step 410. The third-party server 140 may return the DNS record that contains the encrypted session token as a response to the query. The named entity device 130 may use its private key 132 to decrypt the encrypted session token. The named entity device 130 may establish a communication session with the API 116 using the session token. In some cases, in addition to the session token, the API 116 may also require the named entity device 130 to digitally sign its message using the private key 132.

In some embodiments, the named entity device 130 may be associated with enhanced security mechanisms to safeguard any confidential information. For example, in some embodiments, the named entity device 130 is designed so that after the session token is decrypted by the private key 132, the session token is saved in volatile memory. Hence, if a malicious party tries to illegally tamper the named entity device 130 (e.g., an IoT sensor installed at a certain location)

by first removing the named entity device 130, the information stored in the volatile memory disappears when power is removed. As such, the malicious party will not be able to obtain any API credential because the credential is not saved in the named entity device 130. The malicious party will not be able to obtain the session token unless the party can gain control of the software application of the device when power is on. Even so, the session token obtained will be ephemeral.

Conventionally, a DNS record may include a fixed time to live value for the DNS record to reduce the load of the DNS server. In the DNS record that contains the encrypted session token, the DNS record may include a time to live entry that corresponds to a lifetime of the session token. Upon the expiration of the session token, the named entity device 130 may request a new token. For example, the named entity device 130 may transmit a second request to the third-party server 140. In response to the first session token being expired or close to expiration, the third-party server 140 may obtain a second session token from the API 116. The third-party server 140 may encrypt the second session token with the public key corresponding to the named entity device 130. The third-party server 140 may publish the second session token encrypted at the namespace of the DNS for the named entity device 130 to retrieve the second session token at the DNS.

Example Session Token Issuance Processes

FIG. 5 through FIG. 8 includes various flowcharts that illustrate various embodiments of session token issuance processes for the third-party server 140 to obtain a session token on behalf of a named entity device 130, in accordance with some embodiments. Each of the processes shown in FIG. 5 through FIG. 8 may correspond to an example implementation of process 400. However, the process 400 is not limited to the implementations shown in those figures. Also, the disclosure below may discuss certain deviations from the discussion of process 400. Each of the processes may include fewer, additional, or different steps. Also, in some embodiments, certain steps in one of the processes may be combined with other steps in another process.

Figure 5:
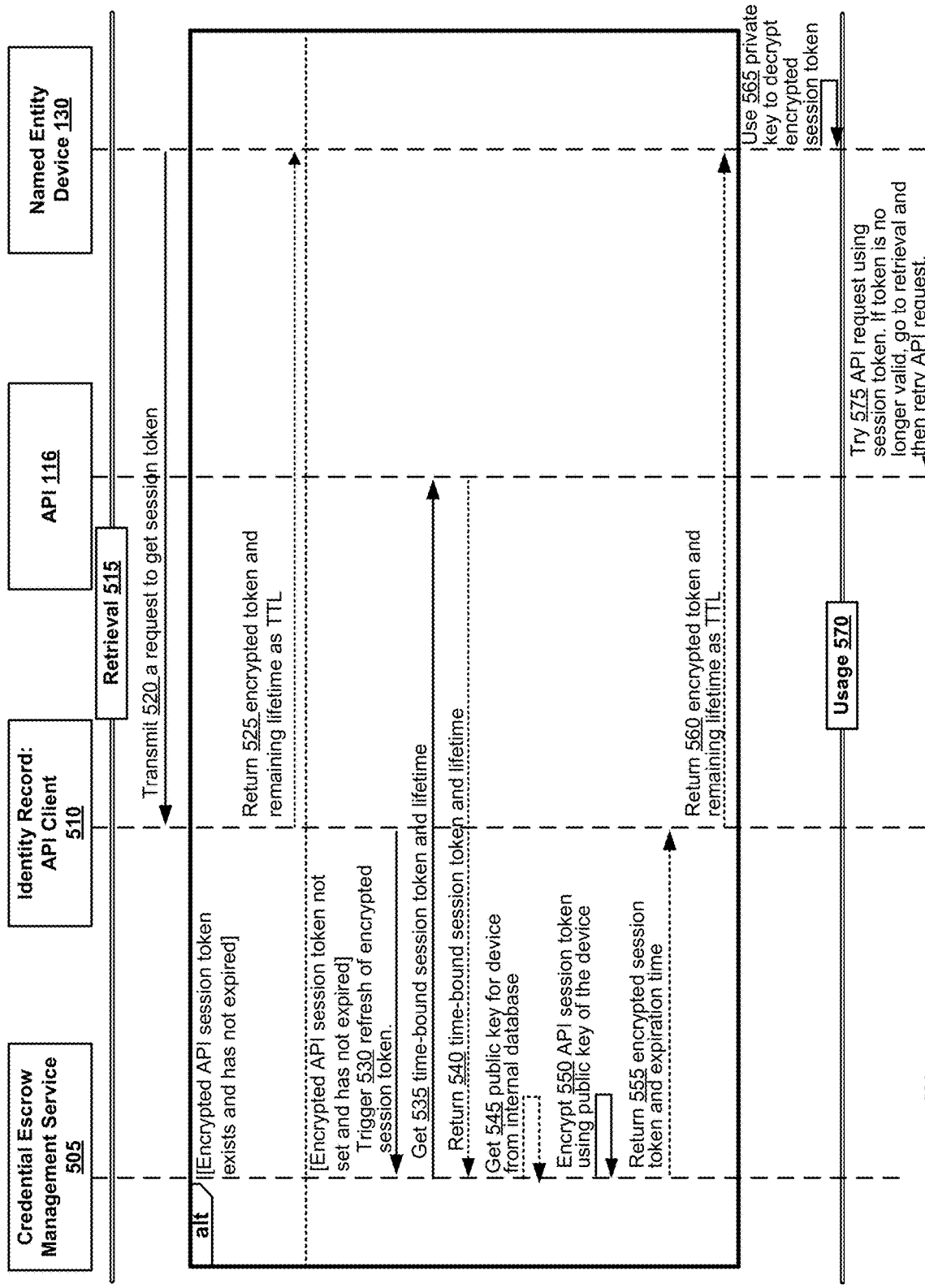
FIG. 5 is a flowchart depicting an example process for obtaining a session token by the third-party server on behalf of a named entity device, in accordance with some embodiments.

FIG. 5 is a flowchart depicting an example flowchart illustrating a token issuance process 500 that is client-driven, in accordance with some embodiments. The process 500 may be an example of a process where the session token issuance is driven by the named entity device 130 (client driven), where the session token is periodically refreshed and replaced with a new token, and where the public key of the named entity device 130 may be stored directly in the credential escrow management service 505. In some embodiments, the credential escrow management service 505 may be an agent of the third-party server 140 and may correspond to services performed by the credential escrow management engine 320. However, in other embodiments, the credential escrow management service 505 may also be an agent of the organization computing server 115. The identity record 510 for the API client may be saved in a DNS (or another suitable namespace system) under the domain of the organization 110. In some embodiments, the identity record 510 may be saved in the sub-namespace that is delegated to the third-party server 140, such as in the delegated namespace zone 142.

An administrator device 114 of the organization 110 may configure the credential escrow management service 505. For example, the administrator device 114 may create a new credential set for the named entity device 130. The credential set may include the named entity device's public key (or certificate), the device's API credentials (e.g., username and password) that may be text based, and the device's name in the DNS. The device's DNS record may include an encrypted credential of the device. The credential set may be deposited to the credential escrow management service 505. The administrator device 114 may also set the name of the named entity device 130 in the DNS as equal to the name as appeared in the identity record 510 for the API client. As discussed in FIG. 4, the DNS identity record 510 for the API client may be different from the DNS identity record for the named entity device.

In a retrieval phase 515, the named entity device 130 may transmit 520 a request to get a session token. The request may take the form of a DNS query sent to the DNS identity record 510 for the API client. The response of the DNS system may depend on whether an encrypted API session token exists and has not expired. If the encrypted API session token exists and has not expired, the DNS that controls the identity record 510 may return 525 encrypted session token and remaining lifetime as the time-to-live (TTL) value.

If the encrypted API session token does not exist or has expired, the DNS for the identity record 510, which may be managed by the credential escrow management service 505, may trigger 530 refreshes of encrypted session token as a request for the credential escrow management service 505. The credential escrow management service 505 may communicate to the API 116 to get 535 time-bound session token and lifetime of the token from the API 116. The get-token request may include the API credential of the named entity device 130. The API 116, in response, may return 540 the time-bound session token and the lifetime of the token to the credential escrow management service 505. The credential escrow management service 505 may get 545 the public key for the device from the internal database of the credential escrow management service 505. The credential escrow management service 505 may encrypt 550 the API session token using the public key of the named entity device 130. The credential escrow management service 505 may return 555 the encrypted session token and lifetime of the token (e.g., expiration time) to the identity record 510 for the API client. The DNS that controls the identity record 510 may return 560 the encrypted session token and remaining lifetime as TTL to the named entity device 130 as a response to the named entity device's request for the session token.

The named entity device 130 may receive the encrypted session token and use 565 its private key 132 to decrypt the encrypted session token. In the usage phase 570, the named entity device may try 575 sending an API request to the API 116 using the session token. If the session token is no longer valid, the named entity device may return to the retrieval phase 515 and retry the API request.

Figure 6:
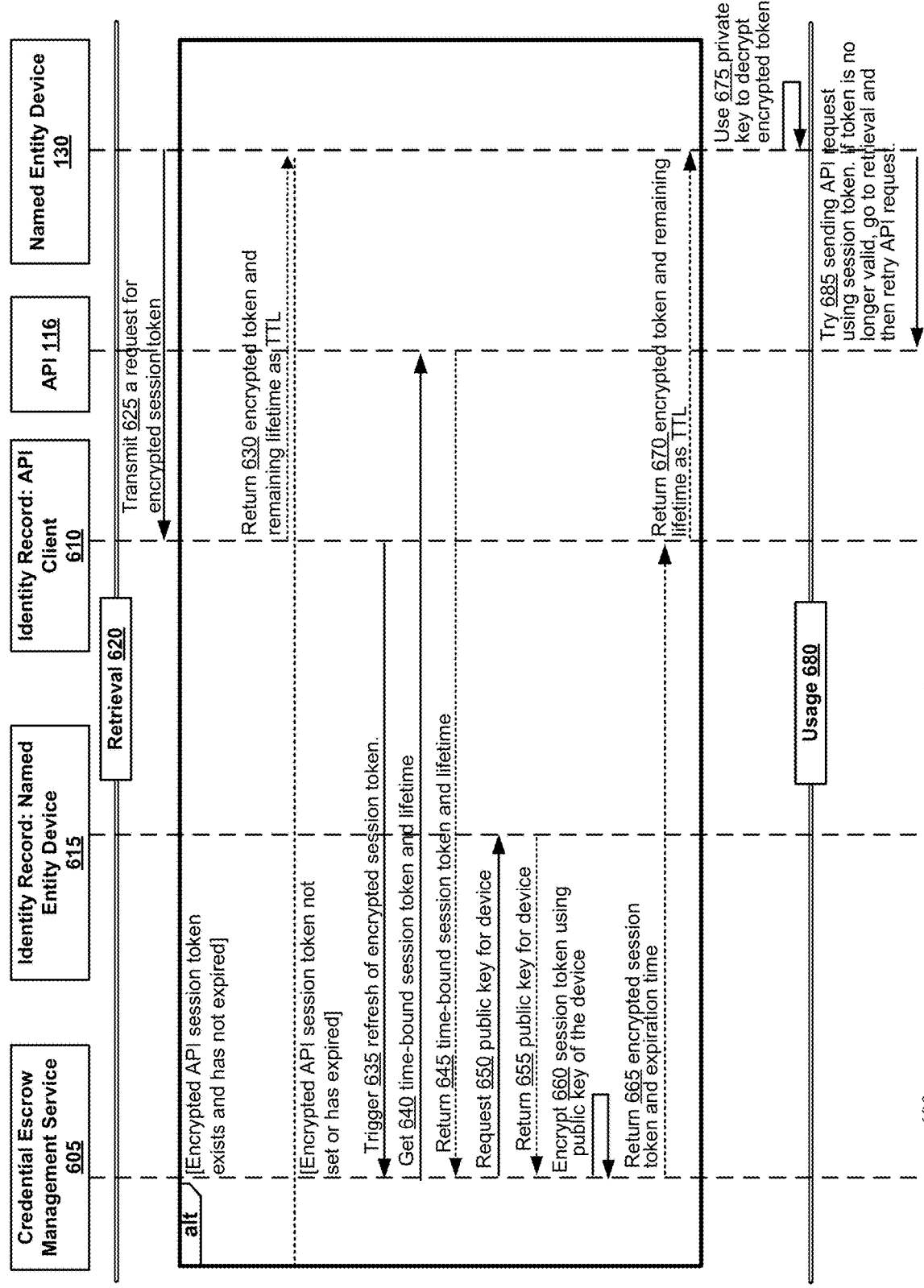
FIG. 6 is a flowchart depicting an example process for obtaining a session token by the third-party server on behalf of a named entity device, in accordance with some embodiments.

FIG. 6 is a flowchart depicting an example flowchart illustrating a token issuance process 600 that is client-driven, in accordance with some embodiments. The process 600 may be an example of a process where the session token issuance is driven by the named entity device 130 (client-driven), where the session token is periodically refreshed and replaced with a new token, and where the public key of the named entity device 130 may reside on the DNS record of the named entity device 130. In some embodiments, the credential escrow management service 605 may be an agent of the third-party server 140 and may correspond to services performed by the credential escrow management engine 320. However, in other embodiments, the credential escrow management service 605 may also be an agent of the organization computing server 115. The identity record 610 for the API client may be saved in a DNS (or another suitable namespace system) under the domain of the organization 110. In some embodiments, the identity record 610 may be saved in the sub-namespace that is delegated to the third-party server 140, such as in the delegated namespace zone 142. The identity record 615 for the named entity device may be a DNS record that is under the domain of an operating party of the named entity device 130.

An administrator device 114 of the organization 110 may configure the credential escrow management service 605. For example, the administrator device 114 may create a new credential set for the named entity device 130. The credential set may include the named entity device's public key record locator (e.g., URI/URL), the device's API credentials (e.g., username and password) that may be text-based, and the device's name in the DNS. Different from the process 500, the public key of the named entity device 130 may reside in the DNS record 615 for the named entity device 130. The device's DNS record 615 may also include an encrypted credential of the device. The credential set may be deposited to the credential escrow management service 605. The administrator device 114 may also set the name of the named entity device 130 in the DNS record 615 as equal to the name as appeared in the identity record 610 for the API client.

In a retrieval phase 620, the named entity device 130 may transmit 625 a request to get an encrypted session token. The request may take the form of a DNS query sent to the DNS identity record 610 for the API client. The response of the DNS system may depend on whether an encrypted API session token exists and has not expired. If the encrypted API session token exists and has not expired, the DNS that controls the identity record 610 may return 630 encrypted token and remaining lifetime as the time-to-live (TTL) value.

If the encrypted API session token does not exist or has expired, the DNS for the identity record 610, which may be managed by the credential escrow management service 605, may trigger 635 refreshes of encrypted session token as a request for the credential escrow management service 605. The credential escrow management service 605 may communicate to the API 116 to get 640 a time-bound session token and lifetime of the token from the API 116. The get-token request may include the API credential of the named entity device 130. The API 116, in response, may return 645 the time-bound session token and the lifetime of the token to the credential escrow management service 605. Based on the public key record locator, the credential escrow management service 605 may communicate to the DNS for the identity record 615 for the named entity device 130 to request 650 the public key for the device. In response, the DNS may return 655 the public key for the device. The credential escrow management service 605 may encrypt 660 the API session token using the public key of the named entity device 130. The credential escrow management service 605 may return 665 the encrypted session token and lifetime of the token (e.g., expiration time) to the identity record 610 for the API client. The DNS that controls the identity record 610 may return 670 the encrypted session token and remaining lifetime as TTL to the named entity device 130 as a response to the named entity device's request for the session token.

The named entity device 130 may receive the encrypted session token and use 675 its private key 132 to decrypt the encrypted session token. In the usage phase 680, the named entity device may try 685 sending an API request to the API 116 using the session token. If the session token is no longer valid, the named entity device may return to the retrieval phase 620 and retry the API request.

Figure 7:
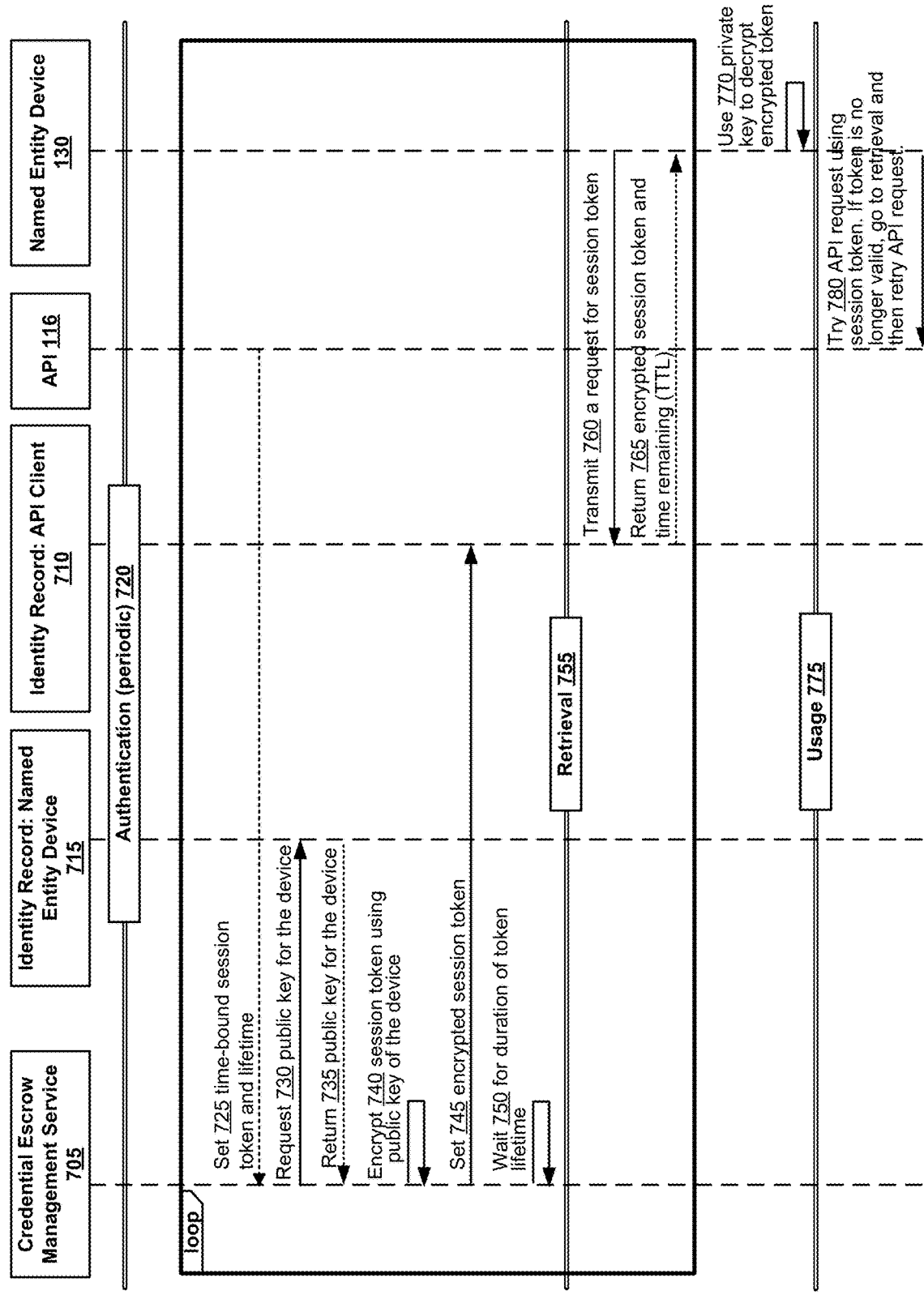
FIG. 7 is a flowchart depicting an example process for obtaining a session token by the third-party server on behalf of a named entity device, in accordance with some embodiments.

FIG. 7 is a flowchart depicting an example flowchart illustrating a token issuance process 700 that is API server-driven, in accordance with some embodiments. The process 700 may be an example of a process where the session token issuance is driven by the API 116, where the session token is periodically refreshed and replaced with a new token, where the public key of the named entity device 130 may reside on the DNS record of the named entity device 130, and where the API 116 periodically pushes session token to the credential escrow management service 705. In some embodiments, the credential escrow management service 705 may be an agent of the third-party server 140 and may correspond to services performed by the credential escrow management engine 320. However, in other embodiments, the credential escrow management service 705 may also be an agent of the organization computing server 115. The identity record 710 for the API client may be saved in a DNS (or another suitable namespace system) under the domain of the organization 110. In some embodiments, the identity record 710 may be saved in the sub-namespace that is delegated to the third-party server 140, such as in the delegated namespace zone 142. The identity record 715 for the named entity device may be a DNS record that is under the domain of an operating party of the named entity device 130.

An administrator device 114 of the organization 110 may configure the credential escrow management service 705. For example, the administrator device 114 may create a new credential set for the named entity device 130. The credential set may include the named entity device's public key record locator (e.g., URI/URL) and the device's name in the DNS. Different from the process 500, the public key of the named entity device 130 may reside in the DNS record 715 for the named entity device 130. Different from the process 600, the API credentials (e.g., API username and password) may be retained by the organization 110 and are not deposited to the credential escrow management service 705. The credential set may be deposited to the credential escrow management service 705. The administrator device 114 may also set the name of the named entity device 130 in the DNS record 715 as equal to the name as appeared in the identity record 710 for the API client.

In a periodic authentication phase 720, the API 116 may automatically authenticate the named entity device 130. The API may set 725 and periodically push the time-bound session token and lifetime to the credential escrow management service 705. Based on the public key record locator, the credential escrow management service 705 may communicate to the DNS for the identity record 715 for the named entity device 130 to request 730 the public key for the device. In response, the DNS may return 735 the public key for the device. The credential escrow management service 705 may encrypt 740 the API session token using the public key of the named entity device 130. The credential escrow management service 705 may set 745 the encrypted session token and lifetime of the token (e.g., expiration time) at the identity record 710 for the API client. The credential escrow management service 705 may wait 750 for the duration of the token lifetime.

In the retrieval phase 755, the named entity device 130 may transmit 760 a request for an encrypted session token. The DNS that controls the identity record 710 may return 765 the encrypted session token and remaining lifetime as TTL to the named entity device 130 as a response to the named entity device's request for the session token. The authentication phase 720 and the retrieval phase 755 may be repeated as loops.

The named entity device 130 may receive the encrypted session token and use 770 its private key 132 to decrypt the encrypted session token. In the usage phase 775, the named entity device may try 780 sending an API request to the API 116 using the session token. If the session token is no longer valid, the named entity device may return to the retrieval phase 755 and retry the API request.

Figure 8:
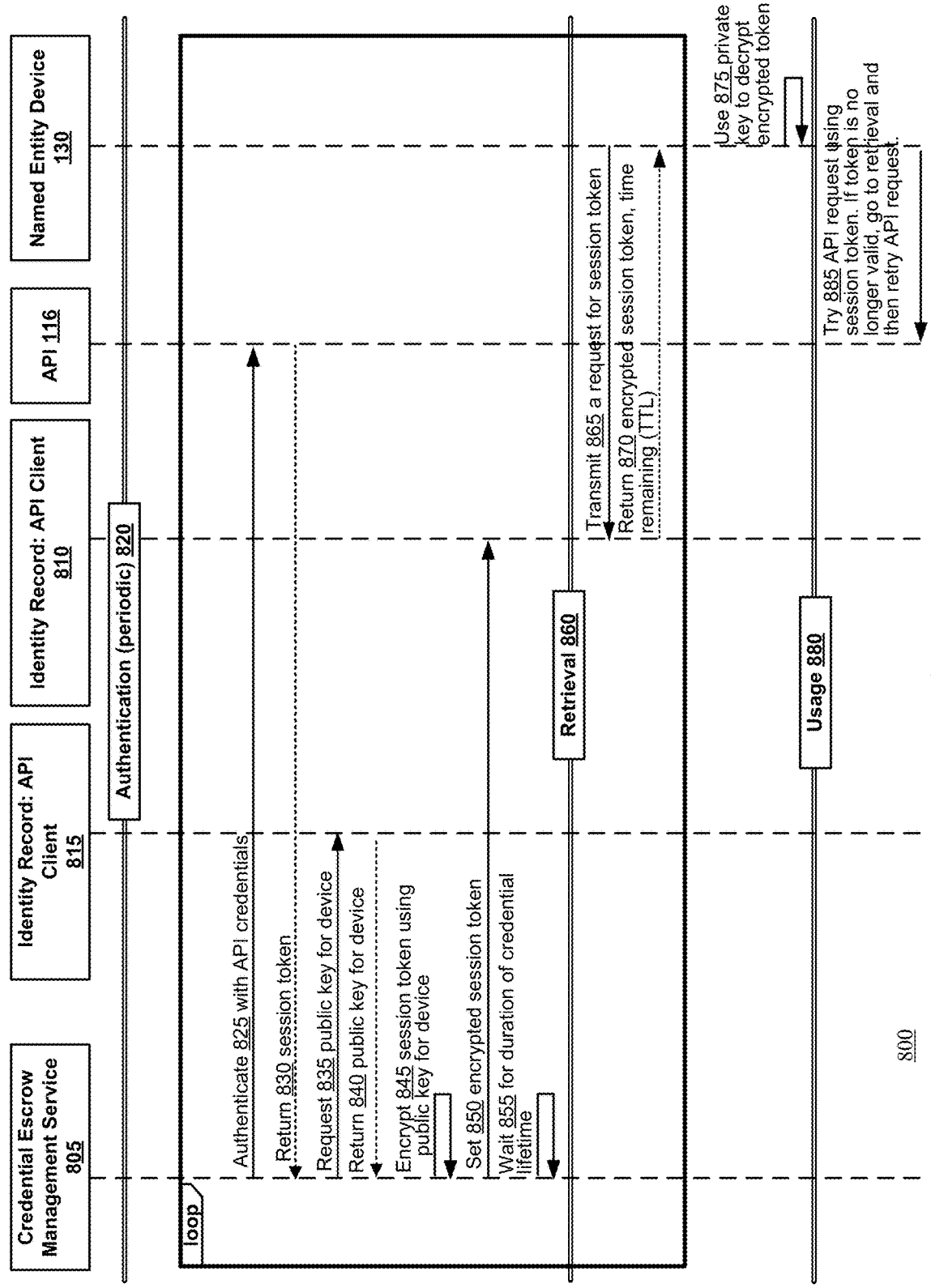
FIG. 8 is a flowchart depicting an example process for obtaining a session token by the third-party server on behalf of a named entity device, in accordance with some embodiments.

FIG. 8 is a flowchart depicting an example flowchart illustrating a token issuance process 800 that is credential escrow management service driven, in accordance with some embodiments. The process 800 may be an example of a process where the session token issuance is driven by the credential escrow management service 805, where the session token is periodically refreshed and replaced with a new token, where the public key of the named entity device 130 may reside on the DNS record of the named entity device 130, and where the credential escrow management service 805 requests for session tokens, periodic or at any timing decided by the credential escrow management service 805. In some embodiments, the credential escrow management service 805 may be an agent of the third-party server 140 and may correspond to services performed by the credential escrow management engine 320. However, in other embodiments, the credential escrow management service 805 may also be an agent of the organization computing server 115. The identity record 810 for the API client may be saved in a DNS (or another suitable namespace system) under the domain of the organization 110. In some embodiments, the identity record 810 may be saved in the sub-namespace that is delegated to the third-party server 140, such as in the delegated namespace zone 142. The identity record 815 for the named entity device may be a DNS record that is under the domain of an operating party of the named entity device 130.

An administrator device 114 of the organization 110 may configure the credential escrow management service 805. For example, the administrator device 114 may create a new credential set for the named entity device 130. The credential set may include the named entity device's public key record locator (e.g., URI/URL), the API credentials (e.g., username and password) of the named entity device 130, and the device's name in the DNS. Different from the process 500, the public key of the named entity device 130 may reside in the DNS record 815 for the named entity device 130. Different from the process 700 but the same as the process 600, the API credentials (e.g., username and password) may be deposited to the credential escrow management service 805. The credential set may be deposited to the credential escrow management service 805. The administrator device 114 may also set the name of the named entity device 130 in the DNS record 815 as equal to the name as appeared in the identity record 810 for the API client.

In a periodic authentication phase 820, the credential escrow management service 805 may authenticate 825 the named entity device 130 by providing the API credentials to the API 116. In response, the API may return 830 the time-bound session token and lifetime to the credential escrow management service 805. Based on the public key record locator, the credential escrow management service 805 may communicate to the DNS for the identity record 815 for the named entity device 130 to request 835 for the public key of the device. In response, the DNS may return 840 the public key for the device. The credential escrow management service 805 may encrypt 845 the API session token using the public key of the named entity device 130. The credential escrow management service 805 may set 850 the encrypted session token and lifetime of the token (e.g., expiration time) at the identity record 810 for the API client. The credential escrow management service 805 may wait 855 for the duration of the token lifetime.

In the retrieval phase 860, the named entity device 130 may transmit 865 a request for an encrypted session token. The DNS that controls the identity record 810 may return 870 the encrypted session token and remaining lifetime as TTL to the named entity device 130 as a response to the named entity device's request for the session token. The authentication phase 820 and the retrieval phase 860 may be repeated as loops.

The named entity device 130 may receive the encrypted session token and use 875 its private key 132 to decrypt the encrypted session token. In the usage phase 880, the named entity device may try 885 sending an API request to the API 116 using the session token. If the session token is no longer valid, the named entity device may return to the retrieval phase 860 and retry the API request.

Computing Use Cases and Implementations

The processes discussed in FIG. 4 through FIG. 8 have various uses and can be implemented in different systems and environments. The description below discusses some of the example uses and implementations. The processes described in this disclosure are by no means limited to the examples given below.

In one embodiment, an example named entity device 130 is a smart fridge that communicates with an organization 110 that performs grocery delivery. The smart fridge may need a session key for interacting with the API of the grocery delivery service. A user, the owner of the smart fridge, has an account with the grocery delivery service. The smart fridge's public key may be stored in a publicly-accessible DNS server, operated by the manufacturer or implementer of the smart fridge. The smart fridge's private key may be stored in the smart fridge's internal storage (or TPM device).

The grocery delivery service associates the person's account with the fridge's DNS record, which contains the fridge's public key. The grocery delivery service operates a DNS server, which presents a unique ID (which is not necessarily derived from the device's internal ID or DNS record containing its public key) for every device, and the TXT record for the unique ID contains the device's session token, encrypted using the public key of the smart fridge. The smart fridge knows its own unique ID for the grocery delivery service, and uses this to query the grocery delivery service's DNS server for the session token, which is encrypted using the device's public key. The smart fridge uses its private key to decrypt the DNS response to obtain its session token, used for interacting with the grocery delivery service.

In further detail, the smart fridge securely stores private keys for the public keys published by the manufacturer (e.g., "Acme Manufacturing") and operator (e.g., "Zodiac Appliances") of the smart fridge. The system may include the smart fridge, the DNS server of the grocery delivery service, the DNS server of the operator, the DNS server of the manufacturer, and a data store showing data that is stored in the grocery delivery service, which is the front end client facing portion of the grocery delivery service. The grocery delivery service front end may execute on the client device of the user, or may execute on the smart fridge, and may be stored as a software application of the smart fridge. The grocery delivery service knows the app-specific device name, "device-001" and the DNS name of the LDevID, which is the public key associated with the smart fridge. The grocery delivery service may periodically rotate and encrypt the token and publish the token via the DNS server. In some embodiments, the grocery delivery service may also delegate the encryption and publication of the encrypted token to a third-party server 140. The smart fridge may use the session token to order items at the grocery delivery service. The smart fridge may also register with other grocery retailers and use similar methods to order items.

In another use case, in some embodiments, the system may be a sensor grid that includes multiple IoT sensors, each of which is an example of named entity device 130. The sensors may be low-power devices that do not possess sufficient security mechanisms to safeguard API credentials. The sensors may communicate with a sensor server via the server's API to upload sensors data. The sensors may use a third-party server 140 to help the sensors to obtain session keys with the sensor server in a secure manner. In yet another use case, the system may be a traffic system that includes sensors and autonomous vehicles. The sensors and autonomous vehicles may be examples of named entity devices 130 and may be in communication with a traffic server. The traffic server use data from the sensors to transmit conditions and warnings to the vehicles. Secure communications may be established using session tokens that are distributed by a third-party server 140.

Computing Machine Architecture

FIG. 9 is a block diagram illustrating components of an example computing machine that is capable of reading instructions from a computer-readable medium and executes them in a processor (or controller). A computer described herein may include a single computing machine shown in FIG. 9, a virtual machine, a distributed computing system that includes multiple nodes of computing machines shown in FIG. 9, or any other suitable arrangement of computing devices.

By way of example, FIG. 9 shows a diagrammatic representation of a computing machine in the example form of a computer system 900 within which instructions 924 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 9 may correspond to any software, hardware, or combined components shown in various figures, such as various servers and devices shown in FIG. 1, various engines and modules shown in FIGS. 2 and 3. While FIG. 9 shows various hardware and software elements, each of the components described in FIG. 1 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the term "machine" and "computer" may also be taken to include any collection of machines that individually or jointly execute instructions 924 to perform any one or more of the methodologies discussed herein.

The example computer system 900 includes one or more processors 902 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 900 may also include a memory 904 that stores computer code including instructions 924 that may cause the processors 902 to perform certain actions when the instructions are executed, directly or indirectly by the processors 902. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 902 and reduces the space required for the memory 904. For example, the machine learning methods described herein reduces the complexity of the computation of the processors 902 by applying one or more novel techniques that simplify the steps in training, reaching convergence, and generating results of the processors 902. The algorithms described herein also reduces the size of the models and datasets to reduce the storage space requirement for memory 904.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though the specification or the claims may refer to some processes to be performed by a processor, this should be construed to include a joint operation of multiple distributed processors.

The computer system 900 may include a main memory 904, and a static memory 906, which are configured to communicate with each other via a bus 908. The computer system 900 may further include a graphics display unit 910 (e.g., a plasma display panel (PDP), a liquid crystal display (LCD), a projector, or a cathode ray tube (CRT)). The graphics display unit 910, controlled by the processors 902, displays a graphical user interface (GUI) to display one or more results and data generated by the processes described herein. The computer system 900 may also include an alphanumeric input device 912 (e.g., a keyboard), a cursor control device 914 (e.g., a mouse, a trackball, a joystick, a motion sensor, or another pointing instrument), a storage unit 916 (a hard drive, a solid state drive, a hybrid drive, a memory disk, etc.), a signal generation device 918 (e.g., a speaker), and a network interface device 920, which also are configured to communicate via the bus 908.

The storage unit 916 includes a computer-readable medium 922 on which is stored instructions 924 embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting computer-readable media. The instructions 924 may be transmitted or received over a network 926 via the network interface device 920.

While computer-readable medium 922 is shown in an example embodiment to be a single medium, the term "computer-readable medium" should be taken to include a single medium or multiple media (e.g., a centralized or distributed database, or associated caches and servers) able to store instructions (e.g., instructions 924). The computer-readable medium may include any medium that is capable of storing instructions (e.g., instructions 924) for execution by the processors (e.g., processors 902) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

Beneficially, various processes described herein, such as the process 400 and its corresponding examples described in FIG. 5 through FIG. 8, enhance the security of various named entity device systems (such as a sensor grid, a network of IoT devices, etc.). Conventionally, API credentials are often saved in the non-volatile memory of a named entity device. A malicious party may sometimes gain the physical possession of the device and may temper with the storage, such as by removing the memory card of the device. This poses a security risk when the malicious party is able to obtain the API credentials. In the arrangement discussed in the process 400, the named entity device 130 may not possess a copy of the credentials. Hence, a tampered device may not have the ability to get a session token itself without the involvement of the third-party server 140.

Also, the use of DNS to distribute encrypted session token allows a secure delivery of session token without adding overhead to a named entity device 130, which is often designed as a simple device, such as in the case of a low-power IoT device. Most IoT devices, in order for the devices to be connected to the Internet, have the ability to communicate under the protocol of DNS. DNS is often a lightweight protocol and can be used with other lightweight protocols such as connectionless protocol UDP. Some connection-oriented protocols such as TCP, along with other protocols such as TLS, may consume significant resources. Although the process 400 may also be used with protocols such as TCP, the process 400 is compatible with lightweight protocols to avoid adding overhead to some simple named entity devices 130.

In some embodiments, the organization computing server 115 can tightly control the load on its API 116 and the session token management system. In some embodiments, key rotation may be performed on a schedule (e.g., in a process shown in FIG. 7), instead of on-demand based on client requests. The organization computing server 115 may allow only one valid session token exists for each client named entity device 130 at a given point in time.

The organization computing server 115 or the third-party server may only publish client device identifiers and encrypted session tokens in DNS. Entities outside the organization 110 cannot effectively associate with the account owned by a person or the named entity device owned by the person. This increases the privacy of the system. If DNS over HTTPS (Hypertext Transfer Protocol Secure) is used by the named entity device 130 for DNS interactions, the device identifier is not discoverable (by reasonable means) by network devices between the named entity device 130 and the DNS service. Intermediate devices cannot even determine that the named entity device 130 is a client of the API 116. This further increases the privacy of the system.

Since the issuance of session tokens may be managed by the organization computing server 115, the load is more predictable and manageable. Session tokens are distributed to clients via the separate system of DNS. This allows for easier scaling of application components related specifically to client authentication. This increases the performance and availability of the system. This system is further useful in preventing the retention of API tokens in an easily-accessible way. In some embodiments, the private key 132 is required for decrypting the session token. The private key 132 is not stored in a way that it can be directly accessed without extensive forensic examination of the TPM itself. In some embodiments of process 400, since the session token may be retrieved again via the DNS, the client device does not need to write the session token to non-volatile storage. Storing the decrypted application token only in volatile storage (RAM) really slims down the attack surface.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A system comprising:
   a third-party server comprising one or more processors and memory, the memory storing computer code comprising instructions, the instructions, when executed by the one or more processors, cause the one or more processors to at least:
   receive, by the third-party server from a named entity device, a request for a credential for the named entity device to communicate with an application programming interface (API), the API associated with a domain;
   obtain, by the third-party server, the credential from the API; and
   encrypt, by the third-party server, the credential with a public key corresponding to the named entity device to generate an encrypted credential; and
   a domain name system (DNS) associated with the domain, the DNS configured to receive the encrypted credential and publish a DNS record at a namespace of the DNS, the DNS record containing the encrypted credential for the named entity device to retrieve the credential.

2. The system of claim 1, wherein the credential includes a session token, and wherein the instruction to obtain the credential from the API comprises instructions, when executed, cause the one or more processors to at least:
   retrieve an API username and password corresponding to the named entity device, the API username and password stored at the third-party server;
   transmit the API username and password to the API for the API to generate the session token; and
   receive the session token.

3. The system of claim 1, wherein the instruction to obtain the credential from the API comprises instructions, when executed, cause the one or more processors to at least:
   receive the credential from the API that periodically pushes refreshed credentials to the third-party server.

4. The system of claim 1, wherein the request from the named entity device for the credential corresponds to a query to the DNS.

5. The system of claim 1, wherein the namespace is a delegated sub-namespace managed by the third-party server, the domain delegating the sub-namespace to the third-party server.

6. The system of claim 1, wherein the credential is a first session token, and the instructions, when executed by the one or more processors, further cause the one or more processors to at least:
   obtain, by the third-party server and responsive to the first session token being expired or close to expiration, a second session token from the API;
   encrypt, by the third-party server, the second session token with the public key corresponding to the named entity device; and
   publish, by the third-party server, the second session token encrypted by the public key at the namespace of the DNS for the named entity device to retrieve the second session token at the DNS.

7. The system of claim 1, wherein the public key is obtained from a DNS record associated with the named entity device.

8. The system of claim 1, wherein credential includes one or more of elements selected from the following: a key identifier, a secret key, a username, a password, and a session token.

9. The system of claim 1, wherein the DNS record includes a time to live entry that corresponds to a lifetime of the credential.

10. The system of claim 1, wherein the named entity device is an Internet-of-Thing (IoT) device that stores a private key corresponding to the public key at a hardware secure element.

11. A computer-implemented method comprising:
   receiving, by a third-party server from a named entity device, a request for a credential for the named entity device to communicate with an application programming interface (API), the API associated with a domain;
   obtaining, by the third-party server, the credential from the API;
   encrypting, by the third-party server, the credential with a public key corresponding to the named entity device to generate an encrypted credential; and
   publishing, by the third-party server, a domain name system (DNS) record at a namespace of a DNS associated with the domain, the DNS record containing the encrypted credential for the named entity device to retrieve the credential at the DNS.

12. The computer-implemented method of claim 11, wherein the credential includes a session token, and wherein obtaining the credential from the API comprises:
   retrieving an API username and password corresponding to the named entity device, the API username and password stored at the third-party server;
   transmitting the API username and password to the API for the API to generate the session token; and
   receiving the session token.

13. The computer-implemented method of claim 11, wherein obtaining the credential from the API comprises:
   receiving the credential from the API that periodically pushes refreshed credentials to the third-party server.

14. The computer-implemented method of claim 11, wherein the request from the named entity device for the credential corresponds to a query to the DNS.

15. The computer-implemented method of claim 11, wherein the namespace is a delegated sub-namespace managed by the third-party server, the domain delegating the sub-namespace to the third-party server.

16. The computer-implemented method of claim 11, wherein the credential is a first session token, and the computer-implemented method further comprises:
   obtaining, by the third-party server and responsive to the first session token being expired or close to expiration, a second session token from the API;
   encrypting, by the third-party server, the second session token with the public key corresponding to the named entity device; and
   publishing, by the third-party server, the second session token encrypted by the public key at the namespace of the DNS for the named entity device to retrieve the second session token at the DNS.

17. The computer-implemented method of claim 11, wherein the public key is obtained from a DNS record associated with the named entity device.

18. The computer-implemented method of claim 11, wherein credential includes one or more of elements selected from the following: a key identifier, a secret key, a username, a password, and a session token.

19. The computer-implemented method of claim 11, wherein the DNS record includes a time to live entry that corresponds to a lifetime of the credential.

20. A non-transitory computer-readable medium configured to store computer code comprising instructions, the instructions, when executed by one or more processors, cause the one or more processors to at least:
   receive, by a third-party server from a named entity device, a request for a credential for the named entity device to communicate with an application programming interface (API), the API associated with a domain;
   obtain, by the third-party server, the credential from the API; and
   encrypt, by the third-party server, the credential with a public key corresponding to the named entity device to generate an encrypted credential; and
   publish a domain name system (DNS) record at a namespace of a DNS associated with the domain, the DNS record containing the encrypted credential for the named entity device to retrieve the credential.

* * * * *